(12) United States Patent
Mizuochi et al.

(10) Patent No.: US 7,965,229 B2
(45) Date of Patent: Jun. 21, 2011

(54) POSITIONING METHOD, PROGRAM, POSITIONING DEVICE, AND ELECTRONIC APPARATUS

(75) Inventors: Shunichi Mizuochi, Nagano (JP); Koichiro Yano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 289 days.

(21) Appl. No.: 12/246,792

(22) Filed: Oct. 7, 2008

(65) Prior Publication Data
US 2009/0096670 A1   Apr. 16, 2009

(30) Foreign Application Priority Data
Oct. 10, 2007 (JP) .................. 2007-264207

(51) Int. Cl.
G01S 19/40 (2010.01)
G01S 19/42 (2010.01)
G01S 19/22 (2010.01)

(52) U.S. Cl. .......... 342/357.23; 342/357.25; 342/357.61
(58) Field of Classification Search ............. 342/357.02, 342/357.12, 357.23, 357.25, 357.61
See application file for complete search history.

(56) References Cited

U.S. PATENT DOCUMENTS

| 7,414,573 | B2 * | 8/2008 | Murphy ................... | 342/357.21 |
| 7,415,354 | B2 * | 8/2008 | Alexander .................... | 701/213 |
| 7,439,908 | B1 * | 10/2008 | Zhodzishsky et al. ... | 342/357.24 |
| 7,692,578 | B2 * | 4/2010 | Vollath et al. ............ | 342/357.27 |
| 7,755,542 | B2 * | 7/2010 | Chen et al. ............... | 342/357.24 |
| 7,777,673 | B2 * | 8/2010 | Mizuochi et al. ........ | 342/357.62 |

FOREIGN PATENT DOCUMENTS
JP   2001-337156 A   12/2001

OTHER PUBLICATIONS

Welch, Greg and Bishop, Gary "An Introduction to the Kalman Filter", Jul. 24, 2006, Department of Computer Science, University of North Carolina.*
Butsch, Felix "Radiofrequency interference and GPS: A growing concern",. Oct. 2002, GPS World.*

* cited by examiner

Primary Examiner — Thomas H Tarcza
Assistant Examiner — Frank McGue
(74) Attorney, Agent, or Firm — Global IP Counselors, LLP

(57) ABSTRACT

A positioning method includes: capturing a satellite signal from a positioning satellite; predicting a state vector including a position of a positioning device and a velocity of the positioning device based on the satellite signal; predicting a first distance-equivalent value indicating a distance between the positioning satellite and the positioning device; measuring a second distance-equivalent value indicating a distance between the positioning satellite and the positioning device; calculating an observed value indicating a difference between the first distance-equivalent value and the second distance-equivalent value; setting a measurement error for the positioning satellite based on a signal strength of the satellite signal; changing the measurement error based on a capture data indicating a data of capturing of the satellite signal; and correcting the state vector using the observed value, and the changed measurement error.

6 Claims, 16 Drawing Sheets

| SIGNAL STRENGTH [dBm] | REFERENCE POSITION R VALUE [m] |
|---|---|
| −130~−135 | 10 |
| −135~−140 | 25 |
| −140~−142 | 50 |
| −142~−145 | 100 |
| −145~−150 | 150 |
| −150~−155 | 200 |
| −155~−160 | 300 |

| XPR | EVALUATION LEVEL |
|---|---|
| ~0.1 | E |
| 0.1~0.3 | D |
| 0.3~0.5 | C |
| 0.5~0.7 | B |
| 0.7~ | A |

FIG.10

| | A | B | C | D | E |
|---|---|---|---|---|---|
| WEAK ELECTRIC FIELD ENVIRONMENT | 0 | +20 | +40 | +60 | +120 |
| MIDDLE ELECTRIC FIELD ENVIRONMENT | 0 | +10 | +20 | +30 | +60 |
| STRONG ELECTRIC FIELD ENVIRONMENT | 0 | +5 | +10 | +15 | +30 |

FIG.11

| CAPTURED SATELLITE | ACTUAL MEAS-UREMENT VALUE | PREDICTED MEAS-UREMENT VALUE |
|---|---|---|
| S1 | (SFreq1,SCP1) | (EFreq1,ECP1) |
| S2 | (SFreq2,SCP2) | (EFreq2,ECP2) |
| S3 | (SFreq3,SCP3) | (EFreq3,ECP3) |
| S4 | (SFreq4,SCP4) | (EFreq4,ECP4) |
| ⋮ | ⋮ | ⋮ |

| CAPTURED SATELLITE | TIME TAKEN FOR CAPTURE | | VARIOUS AMOUNTS AT THE TIME OF CAPTURE | |
| --- | --- | --- | --- | --- |
| | INTEGRATION TIME [s] | MEASUREMENT ACQUISITION REFERENCE TIME ELAPSED TIME [s] | FREQUENCY SWEEP INTERVAL [Hz] | EXISTENCE OF PEAK OF INTEGRATED CORRELATION VALUE |
| S1 | 1.0 | 0.5 | 4.0 | YES |
| S2 | 1.0 | 0.5 | 0.2 | YES |
| S3 | 2.0 | 0 | 50 | NONE |
| S4 | 4.0 | 2.0 | 50 | YES |
| . . . | . . . | . . . | . . . | . . . |

| CAPTURED SATELLITE | CAPTURED SATELLITE SIGNAL RELIABILITY INFORMATION | |
|---|---|---|
| | XPR | EVALUATION LEVEL |
| S1 | 0.62 | B |
| S2 | 0.71 | A |
| S3 | 0.78 | A |
| S4 | 0.45 | C |
| ⋮ | ⋮ | ⋮ |

| CAPTURED SATELLITE | ANGLE OF ELEVATION |
|---|---|
| S1 | 65° |
| S2 | 48° |
| S3 | 35° |
| S4 | 52° |
| ⋮ | ⋮ |

POSITIONING METHOD, PROGRAM, POSITIONING DEVICE, AND ELECTRONIC APPARATUS

The present application claims the priority based on Japanese Patent Applications No. 2007-264207 filed on Oct. 10, 2007, the disclosures of which is hereby incorporated by reference in their entirety.

BACKGROUND

1. Technical Field

The present invention relates to a positioning method, a program, a positioning device, and an electronic apparatus.

2. Related Art

A GPS (global positioning system) is widely known as a positioning system using a satellite and is used in a positioning device built in a mobile phone, a car navigation apparatus, and the like. The GPS measures its current position by executing a positioning operation for calculating four parameter values of three-dimensional coordinate values, which indicate the position of the GPS, and a time error on the basis of information, such as the positions of a plurality of GPS satellites or a pseudo distance from each GPS satellite to the GPS.

However, in the positioning using a satellite signal transmitted from a positioning satellite, it is difficult to avoid generation of a positioning error because there are various kinds of error factors, such as multipath influence. For this reason, various techniques for reducing the positioning error have been proposed. As an example, a technique related to positioning processing using a Kalman filter is disclosed in JP-A-2001-337156.

The Kalman filter uses an estimation method based on the probability theory of estimating a state amount changing with time by using an observed value including a measurement error. In positioning processing using the Kalman filter, the current position of a positioning device is estimated, for example, by setting as an observed value a difference between an actual measurement value and a predicted value of a distance-equivalent value indicating a distance between a GPS satellite and the positioning device.

However, since it is difficult to see the measurement error included in the observed value correctly, calculation has been performed in a condition where the measurement error is set to a fixed value in the related art. In this case, however, since the measurement error largely deviates from a true value, position jump or position delay occurs in the measured position obtained in the positioning processing. As a result, there has been a problem that the positioning accuracy noticeably lowers.

SUMMARY

The invention has been finalized in view of the above-described problems.

In order to solve the above problems, according to a first aspect of the invention, a positioning method in a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between the captured satellite and the positioning device for every captured satellite includes: measuring the distance-equivalent value by executing capture processing for capturing the satellite signal from the positioning satellite; setting an initial value of a measurement error used in the correction processing for the captured satellite on the basis of a signal strength of the captured satellite signal; and changing the measurement error the initial value of which is set on the basis of various amounts at the time of capture when the capture processing on the satellite signal from the captured satellite is performed.

Furthermore, according to a second aspect of the invention, a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between the captured satellite and the positioning device for every captured satellite includes: a capturing section that measures the distance-equivalent value by executing capture processing for capturing the satellite signal from the positioning satellite; a measurement error initial value setting section that sets an initial value of a measurement error used in the correction processing for the captured satellite on the basis of a signal strength of the captured satellite signal; and a first changing section that changes the measurement error the initial value of which is set on the basis of various amounts at the time of capture when the capturing section performs the capture processing on the satellite signal from the captured satellite.

According to the first aspect and the like of the invention, the distance-equivalent value is measured by executing the capture processing for capturing a satellite signal from the positioning satellite. In addition, the initial value of the measurement error used in the correction processing of the state vector related to the captured satellite is set on the basis of the signal strength of the captured satellite signal, and the measurement error the initial value of which is set is changed on the basis of the various amounts at the time of capture when the capture processing on the satellite signal from the captured satellite is performed.

By predicting an approximate value of the measurement error included in the observed value on the basis of the signal strength of the captured satellite signal and setting the value as an initial value and then changing the initial value of the measurement error on the basis of the various amounts at the time of capture, it becomes possible to set a proper value as the measurement error and to improve the positioning accuracy.

Furthermore, according to a third aspect of the invention, in the positioning method according to the first aspect of the invention, predetermined correlation processing and correlation value integration processing may be performed in the capture processing and the changing of the measurement error may include at least changing the measurement error on the basis of an integration time in the correlation value integration processing.

According to the third aspect of the invention, the predetermined correlation processing and correlation value integration processing are performed in the capture processing and the measurement error is changed on the basis of the integration time in the correlation value integration processing. Since it is generally difficult to determine the peak of the integrated correlation value, which is a processing result of the correlation value integration processing, as the receiving environment of a satellite signal gets worse, the capture processing of a satellite signal is performed by setting the integration time in correlation value integration processing long. Accordingly, by making the measurement error larger as the integration time is longer, it becomes possible to set a proper measurement error corresponding to the receiving environment of the satellite signal.

Furthermore, according to a fourth aspect of the invention, in the positioning method according to the first aspect of the invention, predetermined correlation processing and correlation value integration processing may be performed in the capture processing and the changing of the measurement error may include at least changing the measurement error when an integrated correlation value, which is a processing result of the correlation value integration processing, satisfies a predetermined low reliability value condition.

According to the fourth aspect of the invention, the predetermined correlation processing and correlation value integration processing are performed in the capture processing and the measurement error is changed when the integrated correlation value, which is a processing result of the correlation value integration processing, satisfies the predetermined low reliability value condition. In the case when the reliability of the integrated correlation value is low, a possibility of capturing of a satellite signal being unsuccessful is high. Therefore, in this case, processing in which a measurement error is made large is suitable, for example.

Furthermore, according to a fifth aspect of the invention, a positioning method in a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between the captured satellite and the positioning device for every captured satellite includes: setting an initial value of a measurement error used in the correction processing for the captured satellite on the basis of a signal strength of the captured satellite signal; and changing the measurement error the initial value of which is set on the basis of the observed value related to the captured satellite.

Furthermore, according to a sixth aspect of the invention, a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between the captured satellite and the positioning device for every captured satellite includes: a measurement error initial value setting section that sets an initial value of a measurement error used in the correction processing for the captured satellite on the basis of a signal strength of the captured satellite signal; and a second changing section that changes the measurement error the initial value of which is set on the basis of the observed value related to the captured satellite.

According to the fourth aspect and the like of the invention, the initial value of the measurement error used in the correction processing of the state vector for the captured satellite is set on the basis of the signal strength of the captured satellite signal. In addition, the measurement error the initial value of which is set is changed on the basis of the observed value related to the captured satellite. As the observed value increases, the predicted value of the distance-equivalent value between the captured satellite and the positioning device deviates from the actual measurement value. Therefore, in this case, processing in which the measurement error is made larger is suitable, for example.

Furthermore, according to a seventh aspect of the invention, a positioning method in a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between the captured satellite and the positioning device for every captured satellite includes: setting an initial value of a measurement error used in the correction processing for the captured satellite on the basis of a signal strength of the captured satellite signal; and changing the measurement error the initial value of which is set on the basis of an angle of elevation of the captured satellite with respect to the positioning device.

Furthermore, according to an eighth aspect of the invention, a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between the captured satellite and the positioning device for every captured satellite includes: a measurement error initial value setting section that sets an initial value of a measurement error used in the correction processing for the captured satellite on the basis of a signal strength of the captured satellite signal; and a third changing section that changes the measurement error the initial value of which is set on the basis of an angle of elevation of the captured satellite with respect to the positioning device.

According to the seventh aspect and the like of the invention, the initial value of the measurement error used in the correction processing of the state vector related to the captured satellite is set on the basis of the signal strength of the captured satellite signal, and the measurement error the initial value of which is set is changed on the basis of the angle of elevation of the captured satellite with respect to the positioning device. As the angle of elevation of the captured satellite is smaller, the satellite signal from the captured satellite is easily affected by multipath and the like. Therefore, in this case, processing in which a measurement error is made larger is suitable, for example.

According to a ninth aspect of the invention, the positioning method according to the seventh aspect of the invention may further include: determining a receiving environment of the satellite signal from the positioning satellite; and changing a change amount of the measurement error based on the angle of elevation according to the determined receiving environment.

According to the ninth aspect of the invention, the receiving environment of the satellite signal from the positioning satellite is determined and the change amount of the measurement error based on the angle of elevation is changed according to the determined receiving environment. For example, by making the addition amount of a measurement error with respect to the same angle of elevation larger as the receiving environment of the satellite signal gets worse, the measurement error can be set more properly in consideration of the receiving environment of the satellite signal.

Furthermore, according to a tenth aspect of the invention, a positioning method in a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between the captured satellite and the positioning device for every captured satellite includes: measuring the distance-equivalent value by executing capture processing for capturing the satellite signal from the positioning satellite; evaluating the reliability of the captured satellite signal on the basis of a correlation value of correlation processing executed in the capture processing; setting an initial value of a measurement error used in the correction processing for the captured satellite on the basis of a signal strength of the captured satellite signal; and changing the measurement error the initial value of which is set on the basis of the evaluated reliability of the captured satellite signal of the captured satellite.

Furthermore, according to an eleventh aspect of the invention, a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between the captured satellite and the positioning device for every captured satellite includes: a capturing section that measures the distance-equivalent value by executing capture processing for capturing the satellite signal from the positioning satellite; reliability evaluating section that evaluates the reliability of the captured satellite signal on the basis of a correlation value of correlation processing executed in the capture processing; a measurement error initial value setting section that sets an initial value of a measurement error used in the correction processing for the captured satellite on the basis of a signal strength of the captured satellite signal; and a fourth changing section that changes the measurement error the initial value of which is set on the basis of the reliability of the captured satellite signal of the captured satellite evaluated by the reliability evaluating section.

According to the tenth aspect and the like of the invention, the distance-equivalent value is measured by executing the capture processing for capturing the satellite signal from the positioning satellite and the reliability of the captured satellite signal is evaluated on the basis of the correlation value of the correlation processing executed in the capture processing. In addition, the initial value of the measurement error used in the correction processing of the state vector related to the captured satellite is set on the basis of the signal strength of the captured satellite signal, and the measurement error the initial value of which is set is changed on the basis of the evaluated reliability of the captured satellite signal of the captured satellite. A possibility of the positioning accuracy deteriorating becomes high as the reliability of the captured satellite signal becomes low. Therefore, in this case, processing in which the measurement error is made larger is suitable, for example.

According to a twelfth aspect of the invention, the positioning method according to the seventh aspect of the invention may further include: determining a receiving environment of the satellite signal from the positioning satellite; and changing a change amount of the measurement error based on the reliability according to the determined receiving environment.

According to the twelfth aspect of the invention, the receiving environment of the satellite signal from the positioning satellite is determined and the change amount of the measurement error based on the reliability is changed according to the determined receiving environment. For example, by making the addition amount of a measurement error with respect to the same reliability larger as the receiving environment of the satellite signal gets worse, the measurement error can be set more properly in consideration of the receiving environment of the satellite signal.

Furthermore, according to a thirteenth aspect of the invention, there is provided a program causing a computer provided in a positioning device to execute the positioning method according to any one of the first, third, fourth, fifth, seventh, ninth, tenth, twelfth aspects of the invention. In addition, according to a fourteenth aspect of the invention, there is provided an electronic apparatus including the positioning device according to any one of the second, sixth, eighth, and eleventh aspects of the invention.

BRIEF DESCRIPTION OF THE DRAWINGS

The invention will be described with reference to the accompanying drawings, wherein like numbers reference like elements.

FIG. 10 is a view illustrating an example of the data configuration of data for XPR evaluation.

FIG. 11 is a view illustrating an example of the data configuration of data for change of position R value corresponding to XPR evaluation.

FIG. 16 is a view illustrating an example of the data configuration of various amount data at the time of capture for each captured satellite.

FIG. 17 is a view illustrating an example of the data configuration of captured satellite signal reliability information data for each captured satellite.

FIG. 18 is a view illustrating an example of the data configuration of angle-of-elevation data for each captured satellite.

DESCRIPTION OF EXEMPLARY EMBODIMENTS

Figure 1:
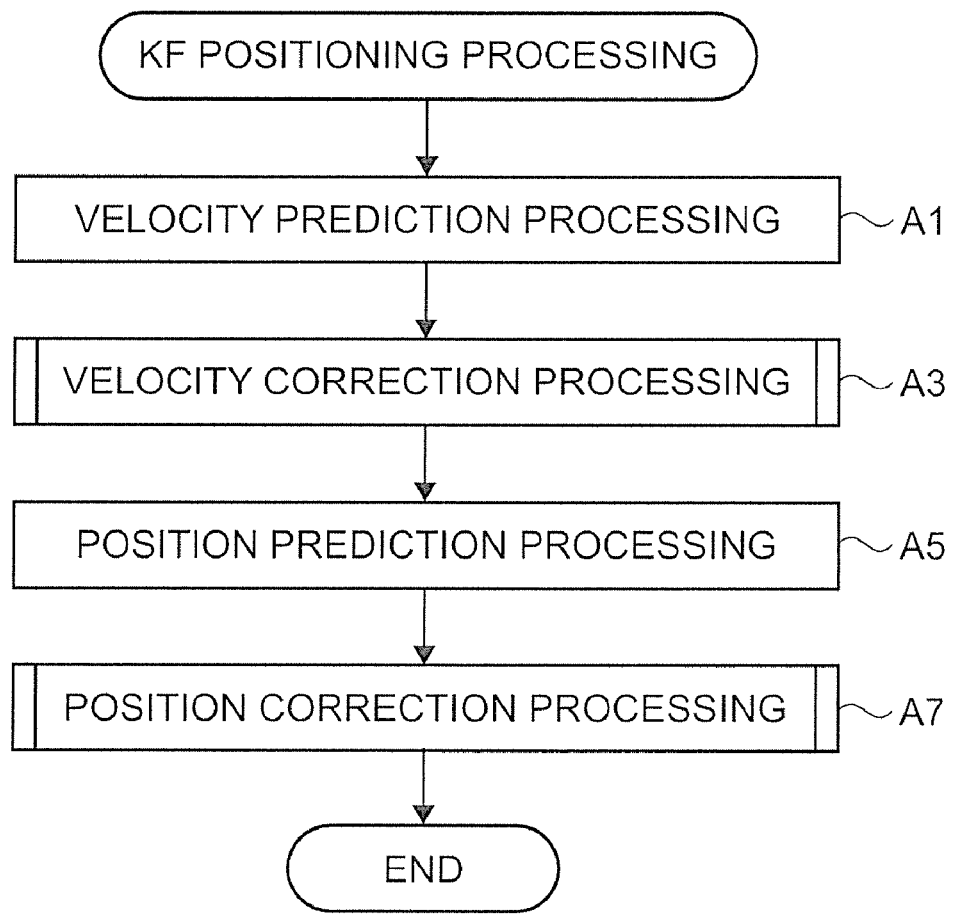
FIG. 1 is a flow chart illustrating the flow of KF positioning processing.

Hereinafter, a preferred embodiment of the invention will be described with reference to the accompanying drawings. In addition, a case where a mobile phone is mentioned as an example of an electronic apparatus including a positioning device and a GPS is used as a positioning system will be described below. However, an embodiment to which the invention can be applied is not limited to the above case.

1. Principles

A mobile phone 1 receives a GPS satellite signal as a positioning signal transmitted (emitted) from a GPS satellite which is a positioning satellite and calculates satellite information, such as the position, movement direction, and velocity of the GPS satellite, on the basis of a navigation message, such as orbital information (ephemeris data and almanac data) on the GPS satellite superimposed on the received GPS satellite signal. The GPS satellite signal is a signal, which is obtained by spread spectrum modulation and is called a C/A (coarse and acquisition) code, and is superimposed on a carrier which has a carrier frequency of 1.57542 [GHz] and is in a band of L1.

In addition, four GPS satellites are disposed on each of six orbital surfaces and are operated, in principle, such that four or more satellites can always be observed under geometric arrangement from anywhere on the earth. In the following description, a GPS satellite that has transmitted a captured GPS satellite signal is referred to as a 'captured satellite' in order to distinguish the GPS satellite from other GPS satellites.

In addition, the mobile phone 1 calculates an electric wave propagation time from the captured satellite to the mobile phone 1 on the basis of a difference between a time when a GPS satellite signal specified by a built-in crystal clock has been received and a time when the GPS satellite has transmitted the received GPS satellite signal. In addition, the distance (pseudo distance) from the captured satellite to the mobile phone 1 is calculated by multiplying the calculated electric wave propagation time by the speed of light.

The mobile phone 1 measures its current position by executing a positioning operation for calculating four parameter values of three-dimensional coordinate values, which indicate the position of the mobile phone 1, and a time error on the basis of satellite information on a plurality of captured satellites or information on a distance (pseudo distance) from each captured satellite to the mobile phone 1, for example.

In the present embodiment, the mobile phone 1 measures its current position by performing positioning processing (hereinafter, referred to as 'LS (least square) positioning processing') using a least square method at the time of first positioning after the start of the GPS and by performing positioning processing (hereinafter, referred to as 'KF (Kalman filter) positioning processing') using a Kalman filter at the time of second and subsequent positioning. Since the LS positioning processing is well-known processing, an explanation thereof will be omitted. Here, the KF positioning processing in the present embodiment will be described in detail.

The Kalman filter uses an estimation method based on the probability theory of estimating a state amount changing with time by using an observed value including a measurement error. In the present embodiment, a state of the mobile phone 1 is expressed as a state vector 'X', and the covariance of an error between the state vector 'X' and a true value is expressed as an error covariance matrix 'P'.

The state vector 'X' is an eight-dimensional vector having three-dimensional position vector (x, y, z), clock bias (b), three-dimensional velocity vector (u, v, w), and clock drift (d) of the mobile phone 1 as elements. In addition, the error covariance matrix 'P' is a matrix of 8×8 indicating the covariance of the error of each element of the state vector 'X'.

In the KF positioning processing, prediction and correction of the state vector 'X' and error covariance matrix 'P' are performed. In the following description, a unit indicating a temporal change (predetermined time interval in calculation processing) in the calculation processing is referred to as '1 time', and the current position of the mobile phone 1 is measured for each time while progressing the time one by one.

FIG. 1 is a flow chart illustrating the flow of KF positioning processing in the present embodiment.

First, velocity prediction processing for predicting the velocity of the mobile phone 1 is performed (step A1). Specifically, predicted values of the current state vector 'X' and error covariance matrix 'P' are calculated according to expressions (1) and (2).

$$X_t^- = X_{t-1}^+ \quad (1)$$

$$P_t^- = \phi_t P_{t-1}^+ \phi_t^T + Q_{t-1} \quad (2)$$

Here, a suffix 't' added below in each expression denotes a time, a suffix '−' added above denotes a predicted value, a suffix '+' added above denotes a correction value, and a suffix 'T' added above denotes a transposed matrix. In addition, 'φ' is a matrix of 8×8 called a state transition matrix, and 'Q' is a matrix of 8×8 called a process noise. Lines of row and columns of the state transition matrix 'φ' and process noise 'Q' correspond to the eight-dimensional components (x, y, z, b, u, v, w, d) of the state vector 'X'.

In the present embodiment, calculation is performed by using the state transition matrix 'φ' expressed by the following expression (3).

$$\phi = \begin{bmatrix} 1 & 0 & 0 & 0 & dt & 0 & 0 & 0 \\ 0 & 1 & 0 & 0 & 0 & dt & 0 & 0 \\ 0 & 0 & 1 & 0 & 0 & 0 & dt & 0 \\ 0 & 0 & 0 & 1 & 0 & 0 & 0 & dt \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \quad (3)$$

Here, 'dt' is a time difference between a time when last KF positioning processing was performed and a current time.

As can be seen from the expression (1), a correction value of the state vector 'X' before 1 time is set to a predicted value of the current state vector 'X' in the velocity prediction processing. That is, it is predicted whether or not the current velocity of the mobile phone 1 is the same as the velocity calculated before 1 time. After performing the velocity prediction processing, velocity correction processing for correcting the predicted velocity is performed (step A3).

Figure 2:
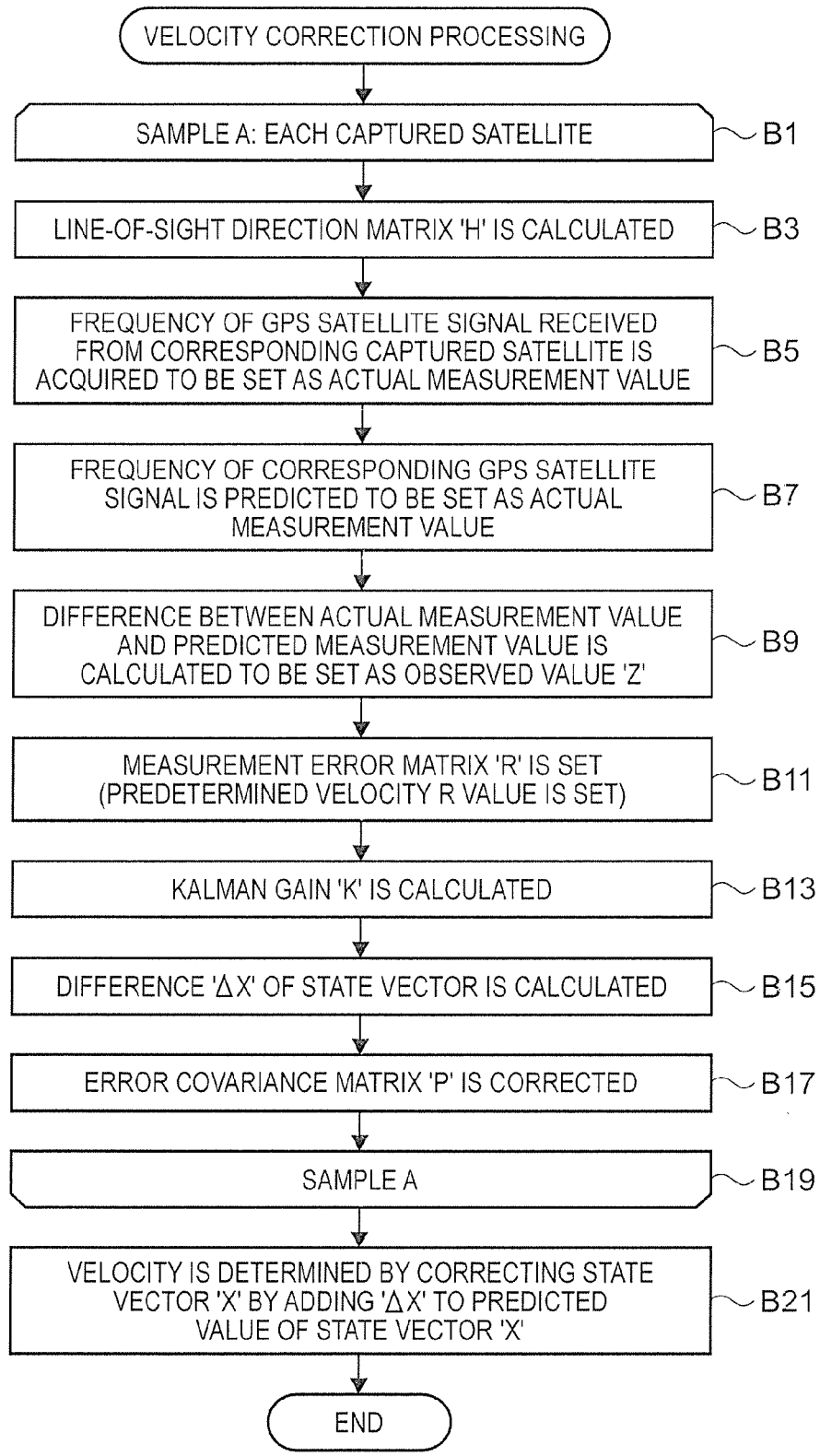
FIG. 2 is a flow chart illustrating the flow of velocity correction processing.

FIG. 2 is a flow chart illustrating the flow of velocity correction processing.

In the velocity correction processing, processing of a loop A is repeatedly executed for each captured satellite (steps B1 to B19). In the loop A, a line-of-sight direction matrix 'H' indicating the line-of-sight direction from the mobile phone 1 to the corresponding captured satellite is first calculated on the basis of information (satellite information) on the position, movement direction, and velocity of the captured satellite and information (hereinafter, comprehensively referred to as 'own information') on the position, movement direction, and velocity of the mobile phone 1 obtained from the predicted value of the state vector 'X' (step B3).

Then, a reception frequency used to receive a GPS satellite signal from the captured satellite is acquired to be set as an actual measurement value regarding the reception frequency (hereinafter, an actual measurement value regarding the received GPS satellite signal is referred to as an 'actual measurement value') (step B5). Although a frequency of the GPS satellite signal is specified as 1.57542 [GHz], the reception frequency in the mobile phone 1 changes according to changes in relative movement direction and movement velocity of the GPS satellite and the mobile phone 1. This frequency shift is a so-called Doppler frequency, and the reception frequency is a frequency after shift caused by the Doppler frequency.

Thereafter, a reception frequency of the GPS satellite signal is predicted on the basis of the satellite information on the captured satellite and the own information and is set as a predicted value regarding the reception frequency (hereinafter, a value obtained by predicting the actual measurement value is referred to as a 'predicted measurement value') (step B7). Then, a difference between the actual measurement value obtained in step B5 and the predicted measurement value calculated in step B7 regarding the reception frequency is calculated to be set as an observed value 'Z' of the captured satellite (step B9).

By using the difference between the actual measurement value and predicted value of the reception frequency of the GPS satellite signal as an input value of the Kalman filter, the variation of the three-dimensional velocity vector (u, v, w) and clock drift (d) of the state vector 'X' can be calculated. In this case, the variation of the three-dimensional position vector (x, y, z) and clock bias (b) of the state vector 'X' is '0'.

Then, a predetermined measurement error matrix 'R' is set as a matrix indicating a measurement error of the observed value 'Z' used as the input value of the Kalman filter (step B11). Specifically, the measurement error matrix 'R' which sets a predetermined value as a value (referred to as a 'velocity R value') of the measurement error of the observed value 'Z' used in the velocity correction processing is set.

Then, a Kalman gain 'K' is calculated according to the following expression (4) using the predicted value of the error covariance matrix 'P' calculated in the velocity prediction processing, the line-of-sight direction matrix 'H', and the measurement error matrix 'R' (step B13).

$$K_t = P_t^- H_t^T (H_t P_t^- H_t^T + R_t)^{-1} \quad (4)$$

Then, a difference 'ΔX' of the state vector is calculated according to the following expression (5) using the Kalman gain 'K', the observed value 'Z', and the line-of-sight direction matrix 'H' (step B15).

$$\Delta X_t = \Delta X_t + K_t(Z_t - H_t \Delta X_t) \quad (5)$$

Then, the error covariance matrix 'P' is corrected according to the following expression (6) using the Kalman gain 'K', the line-of-sight direction matrix 'H', and the predicted value of the error covariance matrix 'P' (step B17).

$$P_t^+ = (I - K_t H_t) P_t^- \quad (6)$$

Here, 'I' is a unit matrix.

The difference 'ΔX' of the state vector and the error covariance matrix 'P' are updated while sequentially performing the processing in steps B3 to B17 for all captured satellites. Then, the velocity of the mobile phone 1 is determined by correcting the state vector 'X' by adding the difference 'ΔX' of the state vector to the predicted value of the state vector 'X' calculated in the velocity prediction processing according to the following expression (7) (step B21).

$$X_t^+ = X_t^- + \Delta X_t \quad (7)$$

In the state vector 'X' obtained in step B21, the three-dimensional velocity vector (u, v, w) and the clock drift (d) are corrected from predicted values, respectively. This is done by calculating the difference 'ΔX' of the state vector using, as the observed value 'Z', the difference between the actual measurement value and predicted measurement value regarding the reception frequency of the GPS satellite signal, as described above. The velocity expressed by the three-dimensional velocity vector (u, v, w) of the state vector 'X' after correction is a velocity of current time.

Returning to the KF positioning processing of FIG. 1, velocity correction processing is performed and then position prediction processing for predicting the position of the mobile phone 1 is performed (step A5). Specifically, the predicted value of the state vector 'X' is calculated by multiplying the correction value of the state vector 'X' obtained in the velocity correction processing by the state transition matrix 'φ' according to the following expression (8).

$$X_t^- = \phi X_t^+ \quad (8)$$

As can be seen from the expression (3), diagonal elements of a matrix portion of 3×3 corresponding to the three-dimensional velocity vector (u, v, w) of the state transition matrix 'φ' are set as a time difference 'dt' between a last time and a current time. Therefore, in the case when the correction value of the state vector 'X' is multiplied by the state transition matrix 'φ', noting the position elements, a current predicted position of the mobile phone 1 is calculated by adding a predicted moving distance to the measured position before 1 time. After performing the position prediction processing, position correction processing for correcting the prediction position is performed (step A7).

Figure 3:
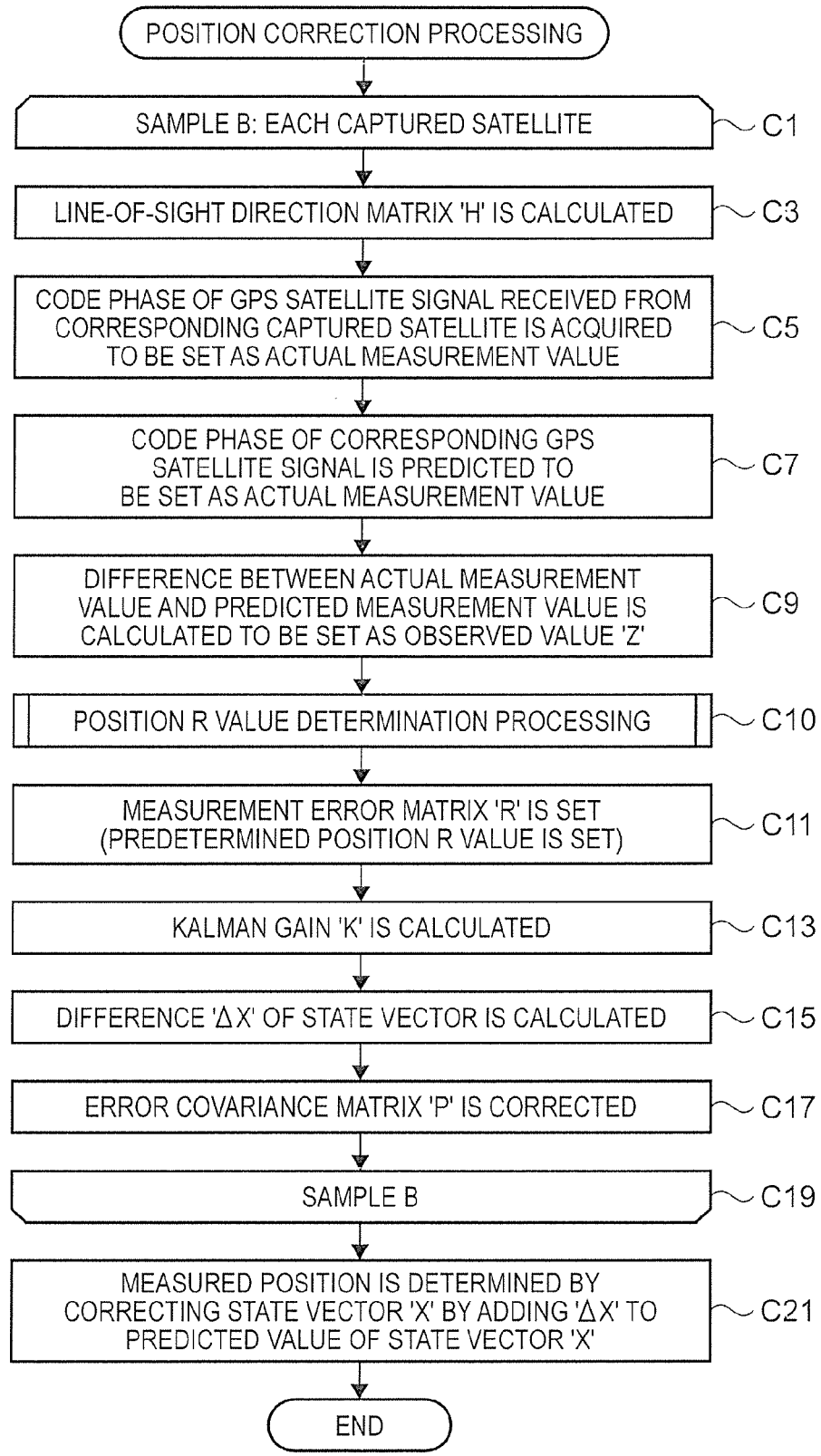
FIG. 3 is a flow chart illustrating the flow of position correction processing.

FIG. 3 is a flow chart illustrating the flow of position correction processing.

Since the flow of the position correction processing is almost the same as that of the velocity correction processing, the following explanation will be focused on different parts. In the position correction processing, a code phase of the GPS satellite signal received from the captured satellite is acquired to be set as an actual measurement value regarding a code phase (step C5), and a code phase of the GPS satellite signal is predicted to be set as the predicted measurement value regarding a code phase (step C7). Then, a difference between the actual measurement value and predicted measurement value regarding the code phase is calculated to be set as the observed value 'Z' which is an input value of the Kalman filter (step C9).

Here, the code phase is a phase of the C/A code modulated into the GPS satellite signal and is a distance-equivalent value indicating a distance between the GPS satellite and the mobile phone 1. Ideally, it may be regarded that C/A codes are continuously arrayed between the GPS satellite and the mobile phone 1. However, the distance from the GPS satellite to the mobile phone 1 does not necessarily be the integral multiple of the length of the C/A code. In this case, the length obtained by adding a fractional part to the integral multiple of the length of the C/A code becomes the distance between the GPS satellite and the mobile phone 1, and a phase equivalent to the fractional part is the code phase.

In addition, since the code phase may also be expressed as a distance, performing the position correction processing using the difference between the actual measurement value and predicted measurement value regarding the code phase as the observed value 'Z' is equivalent to performing the position correction processing using, as the observed value 'Z', a difference between the actual measurement value and predicted value of the distance (length obtained by adding the fractional part to the integral multiple of the length of the C/A code) between the captured satellite and the mobile phone 1. Accordingly, it can be said that the code phase is a value equivalent to the distance between the captured satellite and the mobile phone 1.

By setting the difference between the actual measurement value and predicted measurement value regarding the code phase of the GPS satellite signal as an input value of the Kalman filter, the variation of the three-dimensional position vector (x, y, z) and clock bias (b) of the state vector 'X' can be calculated. In this case, the variation of the three-dimensional velocity vector (u, v, w) and clock drift (d) is '0'.

In addition, in the position correction processing, position R value determination processing which is processing for determining a value (hereinafter, referred to as a 'position R value') of a measurement error of the observed value 'Z' used in the position correction processing is performed in step C10.

The position R value determination processing is processing for determining a position R value by changing an initial value (hereinafter, referred to as a 'reference position R value') of the position R value, which is set on the basis of the signal strength of the GPS satellite signal received from the captured satellite, on the basis of (1) various amounts (hereinafter, referred to as 'various amounts at the time of capture') when processing for capturing the GPS satellite signal has been performed, (2) observed value 'Z' calculated in step C9, (3) angle of elevation of the captured satellite, and (4) reliability of the GPS satellite signal. The position R value determination processing is one of the peculiar processing in the present embodiment. The processing related to determination of the position R value will be described in detail later.

The difference 'ΔX' of the state vector and the error covariance matrix 'P' are updated while sequentially performing the processing in steps C3 to C17 for all captured satellites. Then, the measured position of the mobile phone 1 is determined by correcting the state vector 'X' by adding the difference 'ΔX' of the state vector to the predicted value of the state vector 'X' calculated in the position prediction processing according to the following expression (7) (step C21).

In the state vector 'X' obtained in step C21, the three-dimensional position vector (x, y, z) and the clock bias (b) are corrected from predicted values, respectively. This is done by calculating the difference 'ΔX' of the state vector using, as the observed value 'Z', the difference between the actual measurement value and predicted value regarding the code phase of the GPS satellite signal, as described above. The position expressed by the three-dimensional position vector (x, y, z) of the state vector 'X' after correction is a measured position of current time that is finally calculated.

2. Functional Configuration

Figure 4:
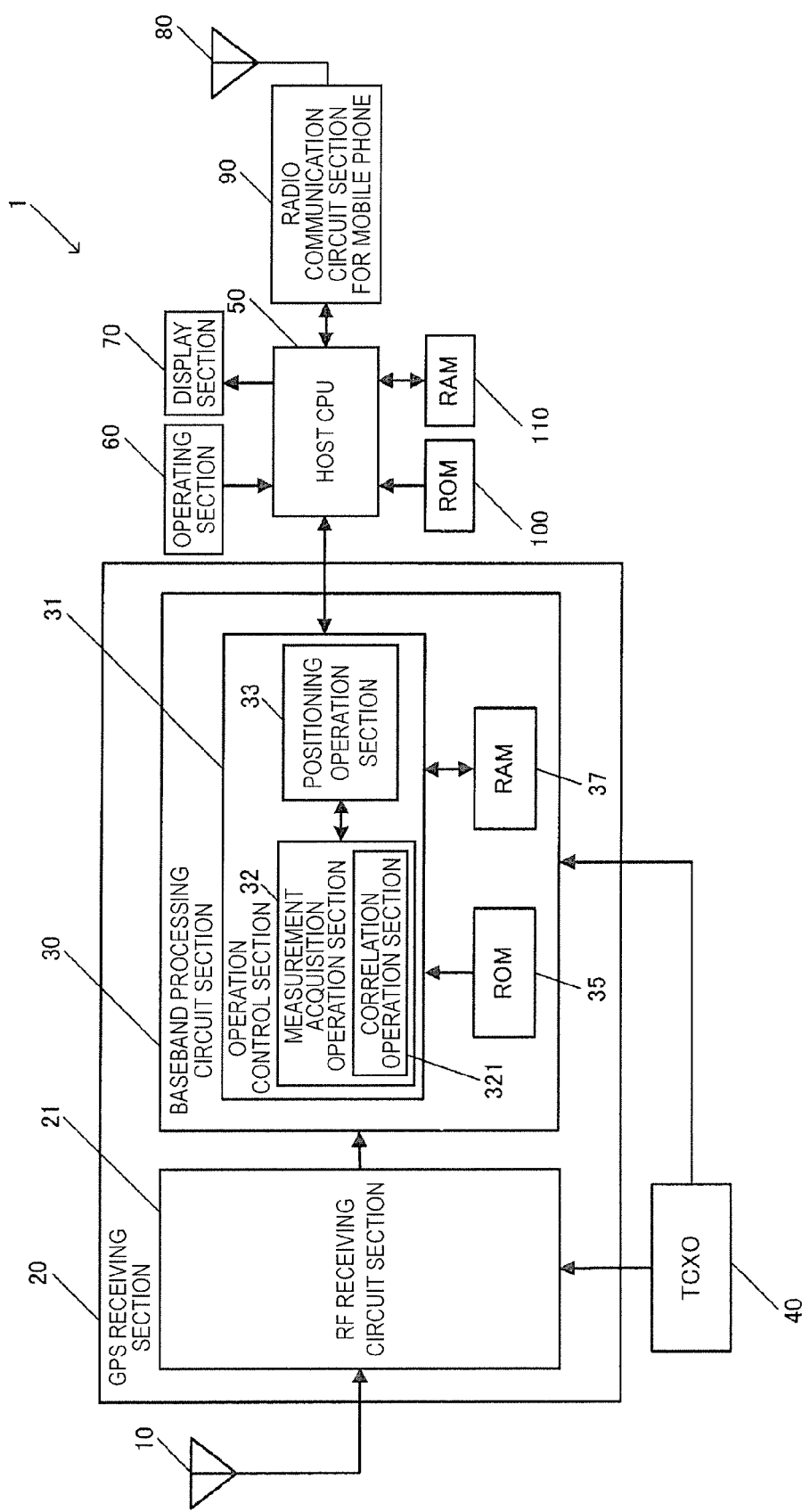
FIG. 4 is a block diagram illustrating the functional constitution of a mobile phone.

FIG. 4 is a block diagram illustrating the functional configuration of the mobile phone 1. The mobile phone 1 is configured to include a GPS antenna 10, a GPS receiving section 20, a TCXO (temperature compensated crystal oscillator) 40, a host CPU (central processing unit) 50, an operating section 60, a display section 70, a mobile phone antenna 80, a radio communication circuit section 90 for mobile phone, a ROM (read only memory) 100, and a RAM (random access memory) 110.

The GPS antenna 10 is an antenna that receives an RF signal including a GPS satellite signal transmitted from the GPS satellite, and outputs the received signal to the GPS receiving section 20.

The GPS receiving section 20 is a positioning section that measures the current position of the mobile phone 1 on the basis of a signal output from the GPS antenna 10, and is a functional block equivalent to a so-called GPS receiver. The GPS receiving section 20 is configured to include an RF (radio frequency) receiving circuit section 21 and a baseband processing circuit section 30. In addition, the RF receiving circuit section 21 and the baseband processing circuit section 30 may be manufactured as separate LSIs (large scale integration) or may be manufactured as one chip.

The RF receiving circuit section 21 is a circuit block of a high-frequency signal (RF signal) and generates an oscillation signal for RF signal multiplication by dividing or multiplying an oscillation signal generated by the TCXO 40. Then, the RF signal is down-converted into a signal (hereinafter, referred to as an 'IF (intermediate frequency) signal') having an intermediate frequency by multiplying the RF signal output from the GPS antenna 10 by the generated oscillation signal, multiplication and the like of the IF signal are performed, and then the IF signal is converted into a digital signal by an A/D converter to be output to the baseband processing circuit section 30.

The baseband processing circuit section 30 is a circuit section that captures and extracts a GPS satellite signal by performing correlation processing and the like on the IF signal output from the RF receiving circuit section 21 and performs a positioning operation by decoding data to obtain a navigation message, time information, and the like. The baseband processing circuit section 30 is configured to include an operation control section 31, a ROM 35, and a RAM 37. In addition, the operation control section 31 is configured to include a measurement acquisition operation section 32 and a positioning operation section 33.

In addition, the measurement acquisition operation section 32 and the positioning operation section 33 may be manufactured as separate LSIs or may be manufactured as one chip. In addition, although it is explained in the present embodiment that the positioning operation of the current position is executed in the positioning operation section 33, it is needless to say that all processing executed in the positioning operation section 33 may be executed by the host CPU 50.

The measurement acquisition operation section 32 is a circuit section that captures and tracks a GPS satellite signal from the received signal (IF signal), which is output from the RF receiving circuit section 21, and is configured to include a correlation operation section 321. The measurement acquisition operation section 32 acquires information, such as a reception frequency or a code phase of the GPS satellite signal that has been captured and tracked, and outputs the information to the positioning operation section 33 as an actual measurement value.

The correlation operation section 321 captures the GPS satellite signal by performing coherent processing (correlation processing) for calculating correlation between a replica code and a C/A code included in the received signal using FFT operation, for example, and performing incoherent processing (correlation value integration processing) for calculating an integrated correlation value by integrating a correlation value which is a result of the coherent processing. The replica code is a simulated signal of the C/A code which is a kind of PRN (pseudo random noise) code included in the GPS satellite signal which is generated in a pseudo manner and is captured. The C/A code has 1023 chips.

If a GPS satellite signal to be captured is right, a C/A code and a replica code included in the GPS satellite signal match each other (capture success). If wrong, the C/A code and the replica code included in the GPS satellite signal do not match (capture failure). Therefore, it can be determined whether or not capturing of a GPS satellite signal has succeeded by determining the peak of the calculated integrated correlation value. Thus, the GPS satellite signal can be captured by performing a correlation operation with the same received signal while sequentially changing a replica code.

Furthermore, the correlation operation section 321 performs the coherent processing and the incoherent processing while changing a frequency of a generated signal of a replica code and a phase when a correlation operation of the C/A code and the replica code is performed. When the frequency of the generated signal of the replica code and the frequency of the received signal match each other and the phases at the time of the correlation operation of the C/A code and the replica code match each other, the integrated correlation value becomes a maximum.

More specifically, ranges of predetermined frequency and code phase corresponding to a GPS satellite signal to be captured are set as search ranges, and a correlation operation in the phase direction for detecting the start position (code phase) of a C/A code and a correlation operation in the frequency direction for detecting a frequency are performed within the above search ranges. The search range related to the frequency is set within a predetermined frequency sweep range having 1.57542 [GHz], which is a carrier frequency of the GPS satellite signal, as a center frequency and the search range related to the phase is set within a code phase range of 1023 chips which are the chip length of the C/A code.

The measurement acquisition operation section 32 outputs various amounts at the time of capture, which are obtained when processing for capturing the GPS satellite signal from the captured satellite is performed, to the positioning operation section 33, separately from the actual measurement value. The various amounts at the time of capture include an integration time according to the incoherent processing of the correlation operation section 321 (hereinafter, referred to as an 'integration time'), an elapsed time from a time when the actual measurement value of the GPS satellite signal is acquired to the present (hereinafter, referred to as a 'measurement acquisition reference time elapsed time'), a sweep interval of a frequency in coherent processing and incoherent processing (hereinafter, referred to as a 'frequency sweep interval'), and existence of the peak of an integrated correlation value (hereinafter, referred to as 'integrated correlation value peak existence').

The correlation operation section 321 performs incoherent processing while shortening the integration time in the environment (strong electric field environment) where a GPS satellite signal with a large signal strength can be received. In the environment (middle electric field environment or weak electric field environment) where only a GPS satellite signal with a middle or small signal strength can be received, however, the correlation operation section 321 performs the incoherent processing while increasing the integration time. This is to make determination of the peak of the integrated correlation value easy by increasing the integration time.

Moreover, in the present embodiment, an explanation will be made assuming that three kinds of environments of 'weak electric field environment', 'middle electric field environment', and 'strong electric field environment' exist as the receiving environment of a GPS satellite signal. The receiving environment may be determined on the basis of the signal strength of a GPS satellite signal captured and a PDOP (position dilution of precision) value which is an index value of satellite arrangement, for example. Since the details are known, an explanation thereof will be omitted.

In addition, the GPS satellite signal may be captured with higher precision as the frequency sweep interval becomes small. In this case, however, a time required for capturing the GPS satellite signals becomes long. In the strong electric field environment, the correlation operation section 321 performs a correlation operation at large frequency sweep intervals (for example, '4 Hz') at first, but performs the correlation operation at very narrow frequency sweep intervals (for example, '0.2 Hz') in a final stage while gradually decreasing the frequency sweep interval. That is, the correlation operation section 321 roughly searches a frequency of a GPS satellite signal at first but gradually changes to search the frequency precisely. In addition, in the middle electric field environment or weak electric field environment, the correlation operation is performed at very large frequency sweep intervals, for example, 50 [Hz].

Figure 5:
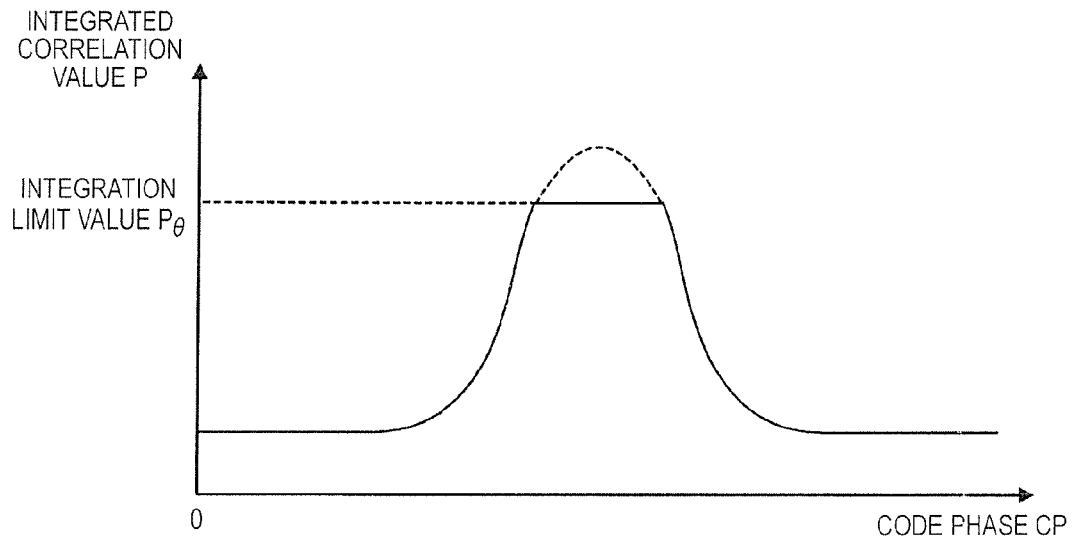
FIG. 5 is a view explaining a method of determining the peak existence of an integrated correlation value.

FIG. 5 is a view explaining a method of determining whether or not the peak of an integrated correlation value exists. In FIG. 5, the correspondence relationship between a code phase and an integrated correlation value in a predetermined frequency is schematically shown in a state where the horizontal axis indicates a code phase CP and the vertical axis indicates an integrated correlation value P.

The correlation operation section 321 integrates the correlation value. However, since there is a limit in a value that can be integrated in terms of a circuit (memory capacity), integration exceeding the limit value cannot be executed. FIG. 5 is an example in a case where integration exceeding an integration limit value $P_\theta$ is executed. A part exceeding the integration limit value $P_\theta$ is set to the integration limit value $P_\theta$. As a result, since the code phase CP having a maximum integrated correlation value (integration limit value $P_\theta$) exists in a plural number, determination of the peak cannot be made. Then, the measurement acquisition operation section 32 makes a determination on whether or not the peak exists as follows. That is, the measurement acquisition operation section 32 determines that there is no peak if the maximum integrated correlation value calculated by the correlation operation section 321 reaches the integration limit value $P_\theta$ and determines that there is a peak if the maximum integrated correlation value does not reach the integration limit value $P_\theta$.

In addition, the measurement acquisition operation section 32 evaluates the reliability of the GPS satellite signal of the captured satellite and outputs the evaluated reliability to the positioning operation section 33, separately from the actual measurement value and the various amounts at the time of capture. Specifically, on the basis of a result of the correlation operation performed by the correlation operation section 321, a reliability index XPR (hereinafter, simply referred to as an 'XPR') is calculated and the XPR is classified into five-step evaluation levels. Then, captured satellite signal reliability information obtained by matching the XPR with the evaluation level is output to the positioning operation section 33.

Figure 6:
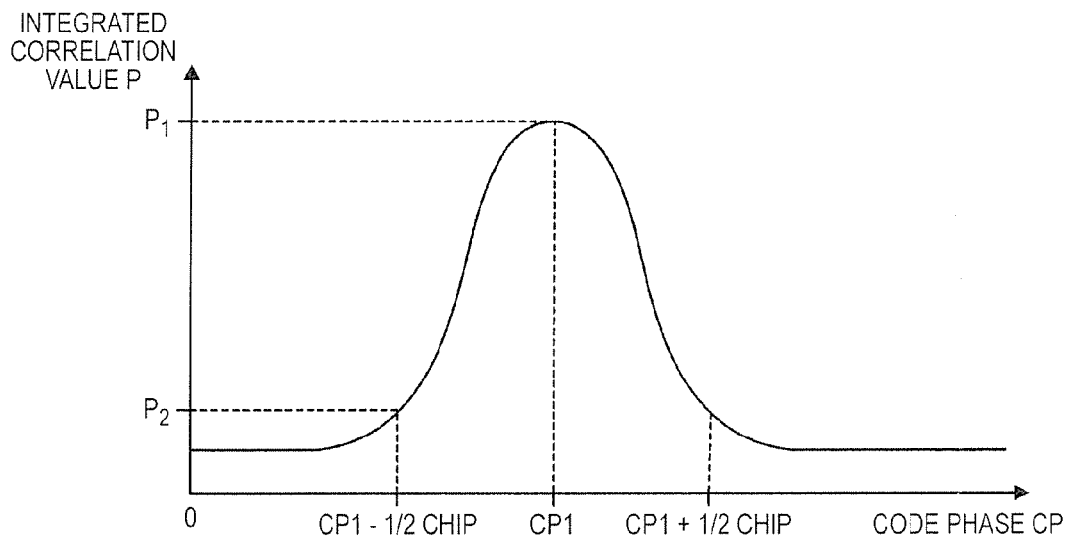
FIG. 6 is a view explaining a method of calculating an XPR.

FIG. 6 is a view explaining a method of calculating the XPR. In FIG. 6, similar to FIG. 5, the correspondence relationship between a code phase and an integrated correlation value in a predetermined frequency is schematically shown in a state where the horizontal axis indicates the code phase CP and the vertical axis indicates the integrated correlation value P.

The measurement acquisition operation section 32 acquires a maximum value '$P_1$' of the integrated correlation value, which is obtained by the correlation operation of the correlation operation section 321, and an integrated correlation value '$P_2$' that is a smaller one of integrated correlation values corresponding to code phases ½ chip distant from the code phase CP1 in which the integrated correlation value is the maximum. Then, the XPR is calculated according to the following expression (9).

$$XPR=(P_1-P_2)/P_1 \quad (9)$$

The positioning operation section 33 performs a positioning operation of measuring the current position of the mobile phone 1 on the basis of the actual measurement value input from the measurement acquisition operation section 32. In addition, the positioning operation section 33 performs processing for determining the position R value, which is used in the KF positioning processing, on the basis of the captured satellite signal reliability information and the various amounts at the time of capture of the GPS satellite signal input from the measurement acquisition operation section 32 or information, such as the calculated observed value 'Z' of the Kalman filter and the angle of elevation of the captured satellite.

Figure 7:
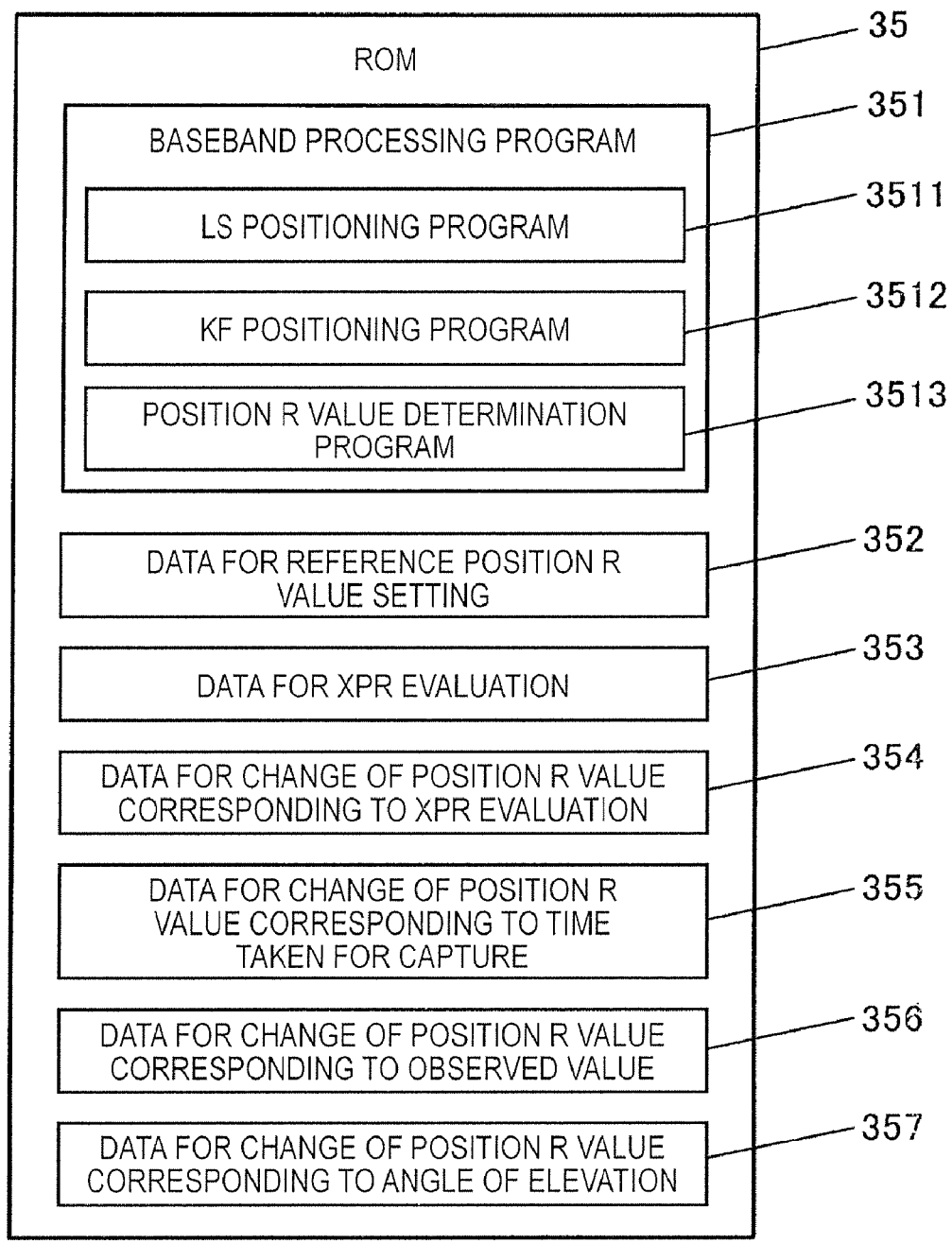
FIG. 7 is a view illustrating an example of data stored in a ROM.

FIG. 7 is a view illustrating an example of data stored in the ROM 35. A baseband processing program 351 which is read by the positioning operation section 33 and is executed as baseband processing (refer to FIG. 20), data 352 for reference position R value setting, data 353 for XPR evaluation, data 354 for change of position R value corresponding to XPR evaluation, data 355 for change of position R value corresponding to time taken for capture, data 356 for change of position R value corresponding to observed value, and data 357 for change of position R value corresponding to angle of elevation are stored in the ROM 35.

In addition, an LS positioning program 3511 executed as LS positioning processing, a KF positioning program 3512 executed as the KF positioning processing (refer to FIGS. 1 to 3), and a position R value determination program 3513 executed as position R value determination processing (refer to FIG. 21) are included as a subroutine in the baseband processing program 351.

The baseband processing is processing in which the positioning operation section 33 performs LS positioning processing in first positioning to measure the current position of the mobile phone 1 and performs KF positioning processing in second and subsequent positioning to measure the current position of the mobile phone 1 and then outputs the measured position. Details of the baseband processing will be described later using a flow chart.

The LS positioning processing is processing in which the positioning operation section 33 measures the current position of the mobile phone 1 by performing a positioning operation using the least square method for a plurality of captured satellites. Since the LS positioning processing is known, a detailed explanation will be omitted.

The KF positioning processing is processing in which the positioning operation section 33 measures the current position of the mobile phone 1 by performing a positioning operation using the Kalman filter for a plurality of captured satellites. The KF positioning processing was already explained with reference to FIGS. 1 to 3.

The position R value determination processing is processing in which the positioning operation section 33 determines a position R value by setting a reference position R value on the basis of the signal strength of a GPS satellite signal received from the captured satellite and changing the reference position R value on the basis of the various amounts at the time of capture of the GPS satellite signal, the observed value 'Z' of the Kalman filter, the angle of elevation of the captured satellite, the captured satellite signal reliability information, and the like. Details of the position R value determination processing will be described later using a flow chart.

Figures 8, 9:
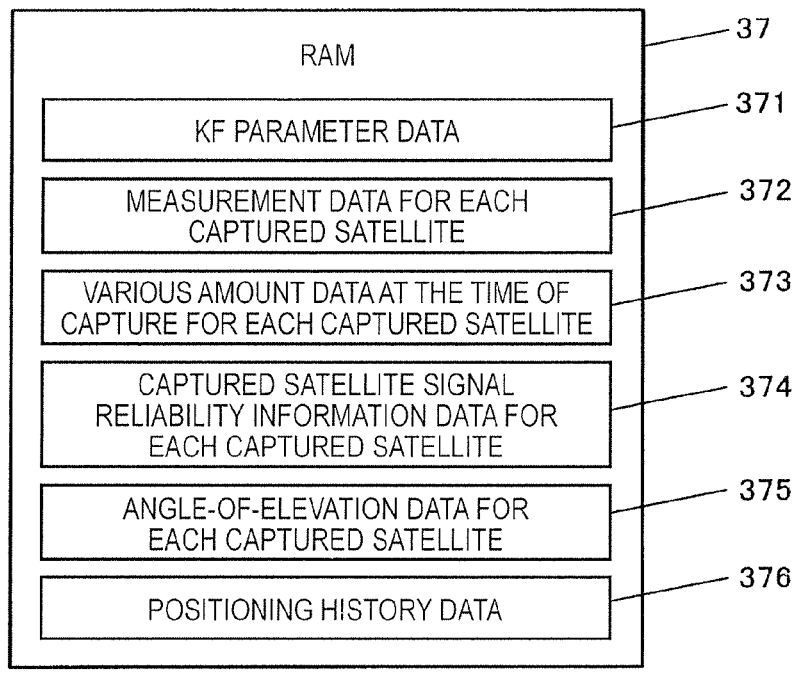
FIG. 8 is a view illustrating an example of data stored in a RAM.
FIG. 9 is a view illustrating an example of the data configuration of data for reference position R value setting.

FIG. 9 is a view illustrating an example of the data configuration of the data 352 for reference position R value setting. A signal strength 3521 which sets a range including the signal strength of the captured GPS satellite signal and a reference position R value 3523 are stored in the data 352 for reference position R value setting so as to match each other. For example, a reference position R value in the case where the signal strength is included in a range of '−140 dBm to −142 dBm' is '50 m'.

In the position R value determination processing, the positioning operation section 33 sets a reference position R value by reading the reference position R value corresponding to the range, in which the signal strength of the GPS satellite signal received from the captured satellite is included, referring to the data 352 for reference position R value setting.

FIG. 10 is a view illustrating an example of the data configuration of the data 353 for XPR evaluation. An XPR 3531 which sets a range where the XPR is included and five-step evaluation levels 3533 are stored in the data 353 for XPR evaluation so as to match each other. For example, an evaluation level in a case which the XPR is included in a range of '0.3 to 0.5' is 'C'.

The measurement acquisition operation section 32 reads an evaluation level corresponding to the range, in which the XPR calculated according to the expression (9) is included, referring to the data 353 for XPR evaluation. Then, the captured satellite signal reliability information obtained by matching the calculated XPR with the read evaluation level is output to the positioning operation section 33.

FIG. 11 is a view illustrating an example of the data configuration of the data 354 for change of position R value corresponding to XPR evaluation. In the data 354 for change of position R value corresponding to XPR evaluation, an amount added to a position R value (hereinafter, referred to as a 'position R value addition amount') is stored for each evaluation level 3533 defined in the data 353 for XPR evaluation, in each receiving environment of GPS satellite signals. For example, in the case when the receiving environment is the 'weak electric field environment' and the evaluation level is 'E', the position R value addition amount is '120'.

In the position R value determination processing, the positioning operation section 33 performs any of position R value change processing for weak electric field environment, position R value change processing for middle electric field environment, and position R value change processing for strong electric field environment according to the receiving environment of GPS satellite signals. In this case, the position R value is changed by reading a position R value addition amount corresponding to the evaluation level included in the captured satellite signal reliability information and the receiving environment referring to the data 354 for change of position R value corresponding to XPR evaluation and then adding the read position R value addition amount to the position R value.

Figure 12:
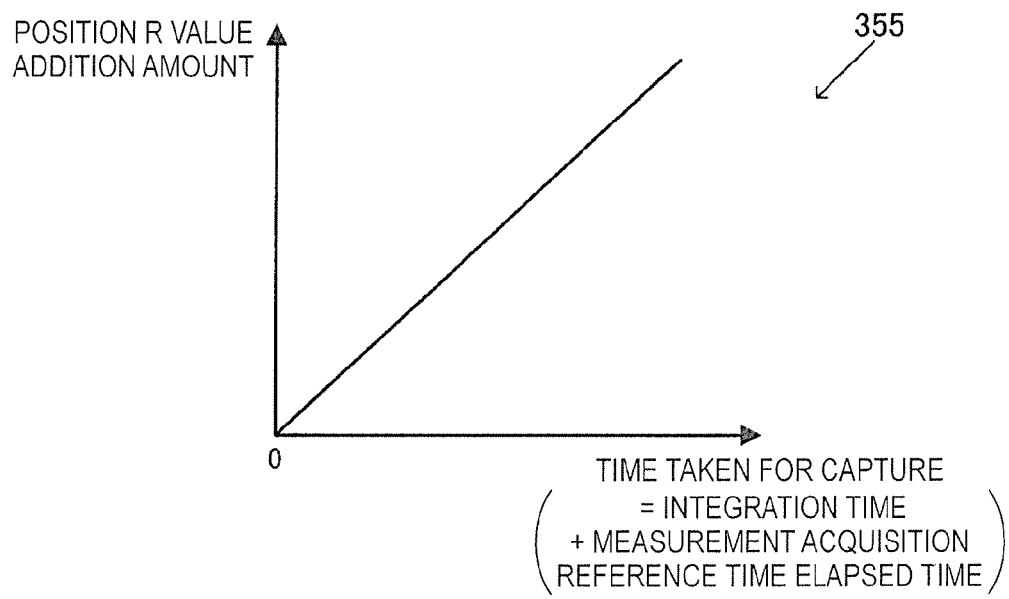
FIG. 12 is a view illustrating the data content of data for change of position R value corresponding to time taken for capture.

FIG. 12 is a view explaining the data content of the data 355 for change of position R value corresponding to time taken for capture. In this drawing, the correspondence relationship between a time taken for capture and a position R value addition amount is qualitatively shown in a state where the horizontal axis indicates the time taken for capture and the vertical axis indicates the position R value addition amount.

The time taken for capture is a time expressed by the sum of an integration time, which is included in the various amounts at the time of capture input from the measurement acquisition operation section 32, and a measurement acquisition reference time elapsed time. In the data 355 for change of position R value corresponding to time taken for capture, the correspondence relationship between the time taken for capture and the position R value addition amount is set such that a larger value is added to the position R value as the time taken for capture becomes longer.

In the position R value determination processing, the positioning operation section 33 calculates the time taken for capture by adding the integration time, which is included in the various amounts at the time of capture input from the measurement acquisition operation section 32, to the measurement acquisition reference time elapsed time. Then, the position R value is changed by reading the position R value addition amount corresponding to the calculated time taken for capture referring to the data 355 for change of position R value corresponding to time taken for capture and adding the read position R value addition amount to the position R value.

Figure 13:
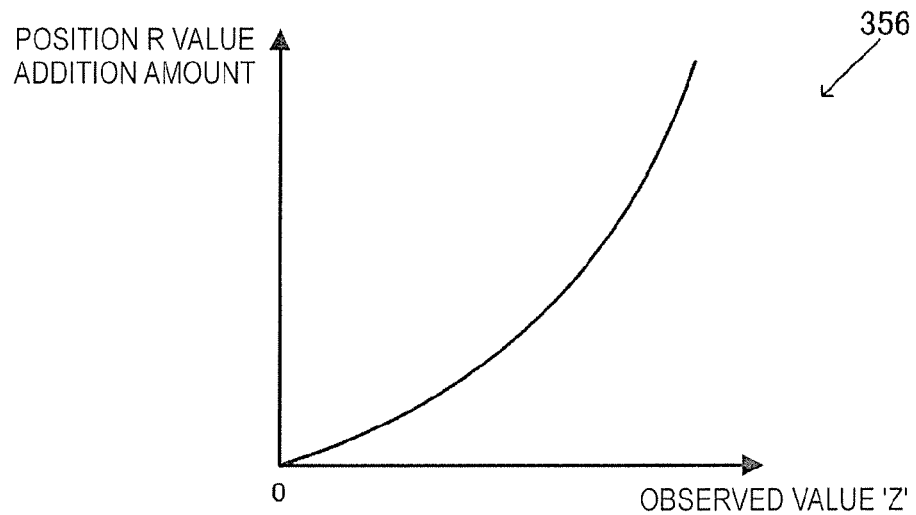
FIG. 13 is a view illustrating the data content of data for change of position R value corresponding to observed value.

FIG. 13 is a view explaining the data content of the data 356 for change of position R value corresponding to observed value. In this drawing, the correspondence relationship between an observed value 'Z' and a position R value addition amount is qualitatively shown in a state where the horizontal axis indicates the observed value 'Z' of the Kalman filter and the vertical axis indicates the position R value addition amount.

In the data 356 for change of position R value corresponding to observed value, the correspondence relationship between the observed value 'Z' and the position R value addition amount is set such that a larger value is added to the position R value as the observed value 'Z' becomes larger. Specifically, the position R value addition amount is decided by the square of the observed value 'Z'.

In the position R value determination processing, the positioning operation section 33 reads the position R value addition amount corresponding to the observed value 'Z' calculated in step C9 of the position correction processing (FIG. 3) referring to the data 356 for change of position R value corresponding to observed value. Then, the position R value is changed by adding the read position R value addition amount to the position R value.

Figures 14, 15:
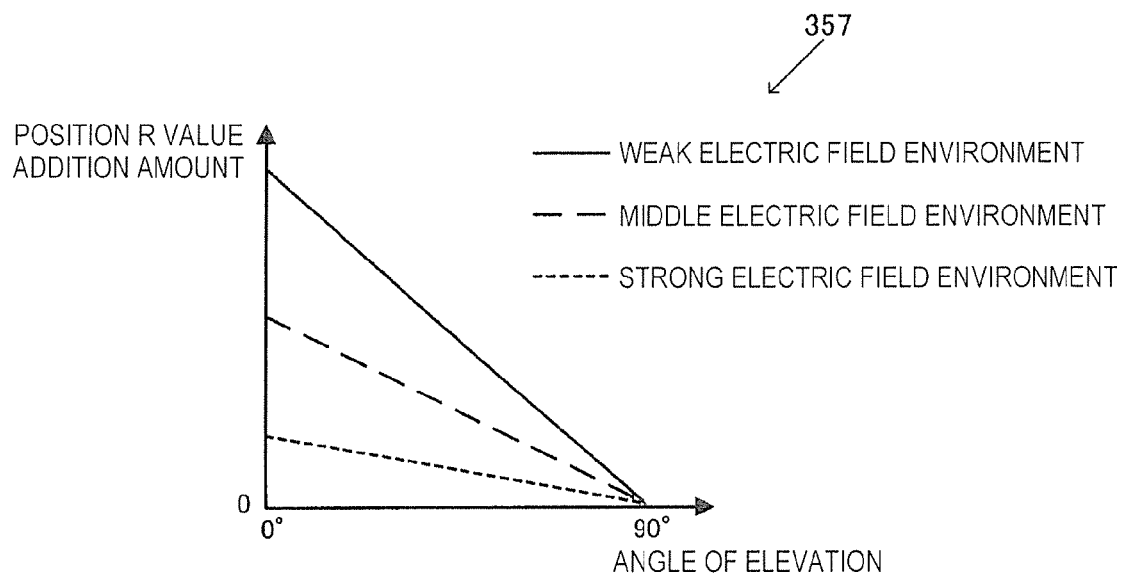
FIG. 14 is a view illustrating the data content of data for change of position R value corresponding to angle of elevation.
FIG. 15 is a view illustrating an example of the data configuration of measurement data for each captured satellite.

FIG. 14 is a view explaining the data content of the data 357 for change of position R value corresponding to angle of elevation. In this drawing, the correspondence relationship between the angle of elevation and the position R value addition amount in each receiving environment is qualitatively shown in a state where the horizontal axis indicates the angle of elevation of a captured satellite and the vertical axis indicates the position R value addition amount.

In any receiving environment, there is no change that the position R value addition amount approaches '0' as the angle of elevation approaches '90°'. However, the slopes of straight lines in the respective receiving environments are different. Specifically, when the angle of elevation is '0°', the position R value addition amount is largest in the weak electric field environment and smallest in the strong electric field environment.

In the position R value determination processing, the positioning operation section 33 performs any of the position R value change processing for weak electric field environment, the position R value change processing for middle electric field environment, and the position R value change processing for strong electric field environment according to the receiving environment of GPS satellite signals. In this case, the position R value is changed by reading a position R value addition amount, which corresponds to the receiving environment and the angle of elevation of the captured satellite, referring to the data 357 for change of position R value corresponding to angle of elevation and then by adding the read position R value addition amount to the position R value.

FIG. 8 is a view illustrating an example of data stored in the RAM 37. KF parameter data 371, measurement data 372 for each captured satellite, various amount data 373 at the time of capture for each captured satellite, captured satellite signal reliability information data 374 for each captured satellite, angle-of-elevation data 375 for each captured satellite, and positioning history data 376 are stored in the RAM 37.

The KF parameter data 371 are data in which values of various parameters of the Kalman filter used in the KF positioning processing are stored and are updated by the positioning operation section 33 in the KF positioning processing as needed.

FIG. 15 is a view illustrating an example of the data configuration of the measurement data 372 for each captured satellite. A captured satellite 3721, an actual measurement value 3723, and a predicted measurement value 3725 are stored in the measurement data 372 for each captured satellite so as to match each other. The number of the captured satellite is stored in the captured satellite 3721. In addition, an actual measurement value and a predicted value of a reception frequency or code phase of the GPS satellite signal received from the captured satellite are stored in the actual measurement value 3723 and the predicted measurement value 3725, respectively.

For example, regarding a captured satellite 'S1', the reception frequency is 'SFreq1' and the code phase is 'SCP1' in the case of an actual measurement value, and the reception frequency is 'EFreq1' and the code phase is 'ECP1' in the case of a predicted measurement value. In the KF positioning processing, the positioning operation section 33 performs velocity correction processing and position correction processing by using a difference between the actual measurement value and the predicted measurement value as the observed value 'Z'.

FIG. 16 is a view illustrating an example of the data configuration of the various amount data 373 at the time of capture for each captured satellite. A captured satellite 3731 and various amounts at the time of capture 3733 are stored in the various amount data 373 at the time of capture for each captured satellite so as to match each other. In addition, a time taken for capture including an integration time and a measurement acquisition reference time elapsed time, a frequency sweep interval, and the existence of an integrated correlation value peak are stored in the various amounts at the time of capture 3733.

For example, the integration time of a captured satellite 'S3' is '2.0 seconds', the measurement acquisition reference time elapsed time is '0 second', the frequency sweep interval is '50 Hz', and the existence of an integrated correlation value peak is 'none'. The various amount data 373 at the time of capture for each captured satellite is updated as needed by causing the positioning operation section 33 to input the various amounts at the time of capture from the measurement acquisition operation section 32.

FIG. 17 is a view illustrating an example of the data configuration of the captured satellite signal reliability information data 374 for each captured satellite. A captured satellite 3741 and captured satellite signal reliability information 3743 are stored in the captured satellite signal reliability information data 374 for each captured satellite so as to match each other. In addition, an XPR and an evaluation level are stored in the captured satellite signal reliability information 3743.

For example, the XPR of the captured satellite 'S3' is '0.78' and the evaluation level is 'A'. The captured satellite signal reliability information data 374 for each captured satellite is updated as needed by causing the positioning operation section 33 to input the captured satellite signal reliability information from the measurement acquisition operation section 32.

FIG. 18 is a view illustrating an example of the data configuration of the angle-of-elevation data 375 for each captured satellite. A captured satellite 3751 and an angle of elevation 3753 of the captured satellite are stored in the angle-of-elevation data 375 for each captured satellite so as to match each other. For example, the angle of elevation of the captured satellite 'S3' is '35°'. The angle-of-elevation data 375 for each captured satellite is updated as needed by calculating the angle of elevation using the positioning operation section 33.

Figure 19:
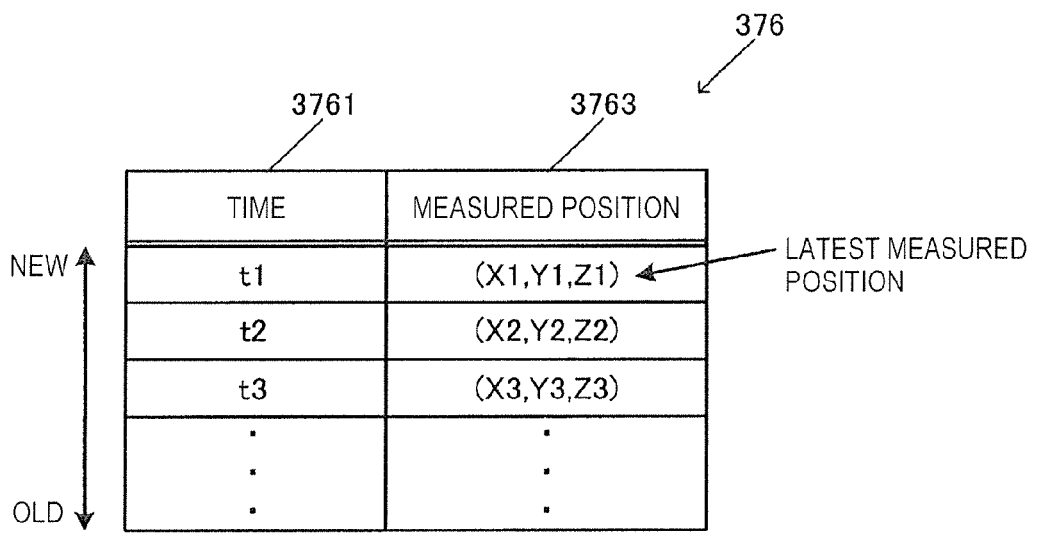
FIG. 19 is a view illustrating an example of the data configuration of positioning history data.

FIG. 19 is a view illustrating an example of the data configuration of the positioning history data 376. In the positioning history data 376, a time 3761 when the measured position is determined and its measured position 3763 are stored in the new positioning order so as to match each other. Of the positioning history data 376, the measured position 3763 corresponding to the latest time 3761 is referred to as a 'latest measured position'. For example, the latest measured position in FIG. 19 is measured position (X1, Y1, Z1) at time 't1'. The positioning history data 376 is updated as needed by causing the positioning operation section 33 to perform positioning processing.

The TCXO 40 is a temperature compensated crystal oscillator which generates an oscillation signal at a predetermined oscillation frequency and outputs the generated oscillation signal to the RF receiving circuit section 21 and the baseband processing circuit section 30.

The host CPU 50 is a processor which makes an overall control of the sections of the mobile phone 1 according to various programs, such as a system program, stored in the ROM 100. The host CPU 50 displays, on the display section 70, a navigation screen on which the latest measured position input from the positioning operation section 33 is plotted.

The operating section 60 is an input device configured to include a touch panel or a button switch, for example, and outputs a signal corresponding to a pressed key or button to the host CPU 50. By the operation of the operating section 60, various kinds of instruction input, such as a call request or a mail transmission or reception request, are performed.

The display section 70 is a display device which is formed by using an LCD (liquid crystal display), for example, and performs various kinds of display on the basis of a display signal input from the host CPU 50. A navigation screen, time information, and the like are displayed on the display section 70.

The mobile phone antenna 80 is an antenna used to perform transmission and reception of a radio signal for mobile phones between the mobile phone 1 and a base station provided by a communication service provider of the mobile phone 1.

The radio communication circuit section 90 for mobile phone is a communication circuit section of a mobile phone configured to include an RF conversion circuit, a baseband processing circuit, and the like and realizes transmission and reception of a call or mail by performing modulation, demodulation, and the like of the radio signal for mobile phones.

The ROM 100 stores a system program, which is used when the host CPU 50 controls the mobile phone 1, and various programs or data used to realize a navigation function, and the like.

The RAM 110 forms a work area in which the system program executed by the host CPU 50, various processing programs, data being processed in various kinds of processing, a processing result, and the like are temporarily stored.

3. Flow of Processing

Figure 20:
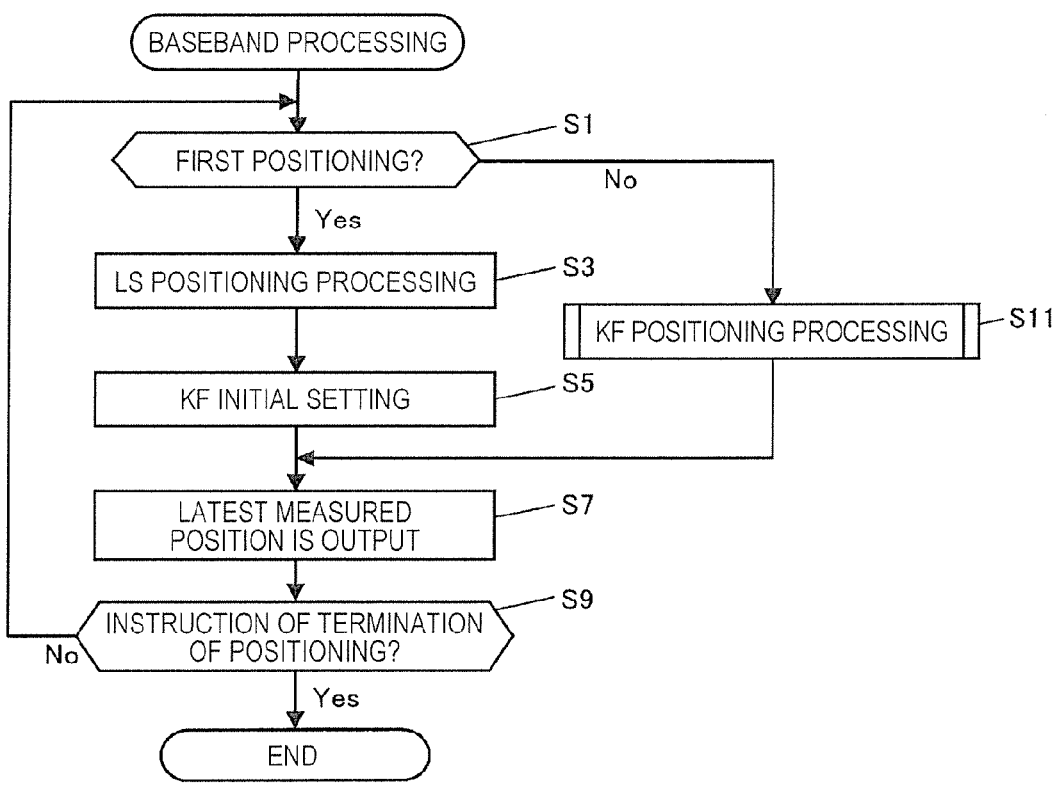
FIG. 20 is a flow chart illustrating the flow of baseband processing.

FIG. 20 is a flow chart illustrating the flow of baseband processing executed in the mobile phone 1 when the positioning operation section 33 reads and executes the baseband processing program 351 stored in the ROM 35.

The baseband processing is processing executed when the RF receiving circuit section 21 receives a GPS satellite signal and the positioning operation section 33 detects that an operation of instructing the start of positioning has been performed in the operating section 60, and is processing executed together with various kinds of processing called execution of various applications. In addition, execution of the processing may also be started when a power supply operation of the mobile phone 1 is detected in a condition where ON/OFF of a power supply of the mobile phone 1 and start/stop of a GPS are simultaneously performed. In principle, the positioning operation is assumed to be performed every '1 second'.

Furthermore, although not particularly described, it is assumed that being under execution of the baseband processing is a state where receiving of an RF signal using the GPS antenna 10, down-conversion to an IF signal using the RF receiving circuit section 21, and acquisition and calculation of an actual measurement value or various amounts at the time of capture and captured satellite signal reliability information using the measurement acquisition operation section 32 are performed as needed.

First, the positioning operation section 33 determines whether or not positioning is performed first (step S1). If it is determined that the positioning is performed first (step S1; Yes), the positioning operation section 33 performs LS positioning processing by reading and executing the LS positioning program 3511 stored in the ROM 35 (step S3).

In the LS positioning processing, the positioning operation section 33 measures the current position of the mobile phone 1 by performing a positioning operation using the least square method for a plurality of captured satellites. Then, the positioning operation section 33 stores the time 3761 and the measured position 3763 in the positioning history data 376 of the RAM 37 so as to match each other.

Subsequently, the positioning operation section 33 performs initial setting of a Kalman filter (step S5). Specifically, the positioning operation section 33 sets the measured position obtained in the LS positioning processing as a position element of a state vector 'X' of the Kalman filter. In addition, predetermined values are set for each element of an error covariance matrix 'P' and other elements of the state vector 'X' and are then stored in the KF parameter data 371 of the RAM 37.

Then, the positioning operation section 33 outputs the latest measured position, which is stored in the positioning history data 376 of the RAM 37, to the host CPU 50 (step S7). Then, it is determined whether or not the user has instructed termination of positioning using the operating section 60 (step S9). If it is determined that the termination of positioning is not instructed (step S9; No), the process returns to step S1. In addition, if it is determined that the termination of positioning has been instructed (step S9; Yes), the baseband processing is completed.

On the other hand, if it is determined that the positioning is not the first positioning (step S1; No), the positioning operation section 33 performs KF positioning processing by reading and executing the KF positioning program 3512 stored in the ROM 35 (step S11). Then, the positioning operation section 33 moves the processing to step S7.

In the KF positioning processing, the positioning operation section 33 executes processing according to the flow chart of FIGS. 1 to 3. In this case, in step C10 of the position correction processing shown in FIG. 3, the positioning operation section 33 performs the position R value determination processing by reading and executing the position R value determination program 3513 stored in the ROM 35.

Figure 21:
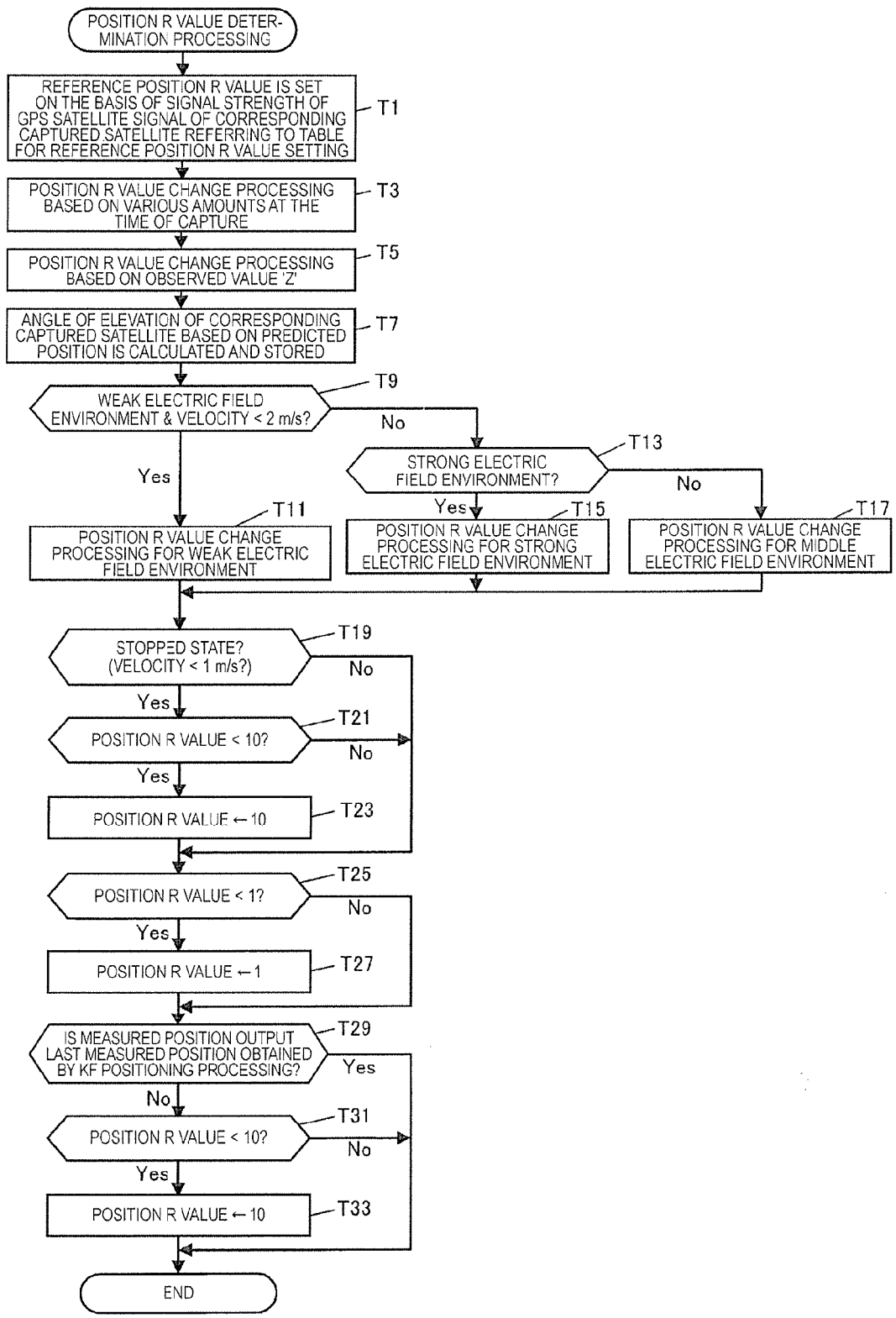
FIG. 21 is a flow chart illustrating the flow of position R value determination processing.

FIG. 21 is a flow chart illustrating the flow of position R value determination processing.

First, the positioning operation section 33 calculates the reference position R value 3523 corresponding to the signal strength 3521 of a GPS satellite signal of the captured satellite referring to the table 352 for reference position R value setting stored in the ROM 35 and sets the calculated reference position R value 3523 as an initial value of the position R value (step T1).

Subsequently, the positioning operation section 33 performs position R value change processing on the basis of the various amounts at the time of capture (step T3). Specifically, the time taken for capture is calculated by adding the measurement acquisition reference time elapsed time and the integration time of the various amounts 3733 at the time of capture of the captured satellite, which are stored in the various amount data 373 at the time of capture for each captured satellite of the RAM 37. Then, the position R value is changed by reading the position R value addition amount corresponding to the calculated time taken for capture referring to the data 355 for change of position R value corresponding to time taken for capture stored in the ROM 35 and adding the read position R value addition amount to the reference position R value.

In addition, the positioning operation section 33 determines whether or not the frequency sweep interval of the various amount data 3733 at the time of capture of the captured satellite is equal to or larger than '0.8 Hz' or the integrated correlation value peak existence is 'none' in the case when the receiving environment is a strong electric field environment. Then, if the above conditions are satisfied, '50' is added to the position R value.

Then, the positioning operation section 33 performs position R value change processing on the basis of the observed value 'Z' (step T5). Specifically, referring to the data 356 for change of position R value corresponding to observed value stored in the ROM 35, a position R value addition amount corresponding to the observed value 'Z' regarding the code phase of the captured satellite stored in the KF parameter data 371 of the RAM 37 is read. Then, the position R value is changed by adding the read position R value addition amount to the position R value.

Then, the positioning operation section 33 calculates the angle of elevation of the captured satellite based on the predicted position of the mobile phone 1 obtained in the position prediction processing (step A5 of FIG. 1) and stores the calculated angle of elevation in the angle-of-elevation data 375 for each captured satellite of the RAM 37 (step T7).

Then, the positioning operation section 33 determines whether or not the receiving environment of a GPS satellite signal is a 'weak electric field environment' and the velocity of the mobile phone 1 obtained in the velocity correction processing (step A3 of FIG. 1 and FIG. 2) is less than '2 m/s' (step T9). If it is determined that the above conditions are satisfied (step T9; Yes), position R value change processing for weak electric field environment is performed (step T11).

Specifically, referring to the data 354 for change of position R value corresponding to XPR evaluation stored in the ROM 35, a position R value addition amount which is set in a condition where a receiving environment is the weak electric field environment and corresponds to an evaluation level of the captured satellite signal reliability information 3743 stored in the captured satellite signal reliability information data 374 for each captured satellite of the RAM 37 is read. Then, the position R value is changed by adding the read position R value addition amount to the position R value.

In addition, the positioning operation section 33 reads a position R value addition amount corresponding to the angle of elevation calculated in step T7 when the receiving environment is the weak electric field environment, referring to the data 357 for change of position R value corresponding to angle of elevation stored in the ROM 35. Then, the position R value is changed by adding the read position R value addition amount to the position R value.

On the other hand, if it is determined that the above conditions are not satisfied in step T9 (step T9; No), the positioning operation section 33 determines whether or not the receiving environment of a GPS satellite signal is a 'strong electric field environment' (step T13). If it is determined that the receiving environment is the 'strong electric field environment' (step T13; Yes), position R value change processing for strong electric field environment is performed (step T15). In addition, if it is determined that the receiving environment is not the 'strong electric field environment' in step T13 (step T13; No), position R value change processing for middle electric field environment is performed (step T17).

In the position R value change processing for strong electric field environment and the position R value change processing for middle electric field environment, the positioning operation section 33 changes a position R value by reading a position R value addition amount, which corresponds to the angle of elevation and the evaluation level of the captured satellite, from position R value addition amounts, which are under the 'strong electric field environment' when the receiving environment is for the position R value change processing for strong electric field environment and under the 'middle electric field environment' when the receiving environment is for the position R value change processing for middle electric field environment, among the data 354 for change of position R value corresponding to XPR evaluation and the data 357 for change of position R value corresponding to angle of elevation which are stored in the ROM 35 and then adding the read position R value addition amount to the position R value.

After performing any one of processing in steps T11, T15, and T17, the positioning operation section 33 determines whether or not the mobile phone 1 is in a stopped state (step T19). Specifically, if the velocity of the mobile phone 1 obtained in the velocity correction processing (step A3 of FIG. 1 and FIG. 2) is less than '1 m/s', it is determined that the mobile phone is in the stopped state.

Then, in the case when it is determined that the mobile phone is in the stopped state (step T19; Yes), the positioning operation section 33 determines whether or not the position R value is less than '10' (step T21). If it is determined that the position R value is less than '10' (step T21; Yes), the position R value is set to '10' (step T23).

In the case when it is determined that the mobile phone 1 is in the stopped state, correction of position is strongly performed if the position R value is too small. As a result, the traceability of a measured position when the mobile phone 1 starts to move gets worse. For this reason, an improvement in the traceability of the measured position is made by setting to '10' a minimum value of the position R value when it is determined that the mobile phone 1 is in the stopped state.

On the other hand, the positioning operation section 33 moves the processing to step T25 when it is determined that the mobile phone 1 is not in the stopped state in step T19 (step T19; No) or when it is determined that the position R value is equal to or larger than '10' in step T21 (step T21; No).

Then, the positioning operation section 33 determines whether or not the position R value is less than '1' (step T25). If it is determined that the position R value is equal to or larger than '1' (step T25; No), the positioning operation section 33 moves the processing to step T29. If it is determined that the position R value is less than '1' (step T25; Yes), the positioning operation section 33 sets the position R value to '1' (step T27). The reason why a minimum value of the position R value is set to '1' is to prevent position jump from occurring in a measured position by making the correction of position weak.

Then, the positioning operation section 33 determines whether or not the measured position output last is a measured position obtained by the KF positioning processing (step T29). If it is determined that the measured position is not a measured position obtained by the KF positioning processing (step T29; No), the positioning operation section 33 determines whether or not the position R value is less than '10' (step T31).

Then, if it is determined that the position R value is less than '10' (step T31; Yes), the positioning operation section 33 sets the position R value to '10' (step T33), completing the position R value determination processing. Immediately after shifting from the LS positioning processing to the KF positioning processing, the minimum value of the position R value is set to '10' in order to improve the traceability of the measured position.

In addition, the positioning operation section 33 completes the position R value determination processing when it is determined that the measured position is a measured position obtained by the KF positioning processing in step T29 (step T29; Yes) or when it is determined that the position R value is equal to or larger than '10' in step T31 (step T31; No).

4. Experimental Result

Figure 22:
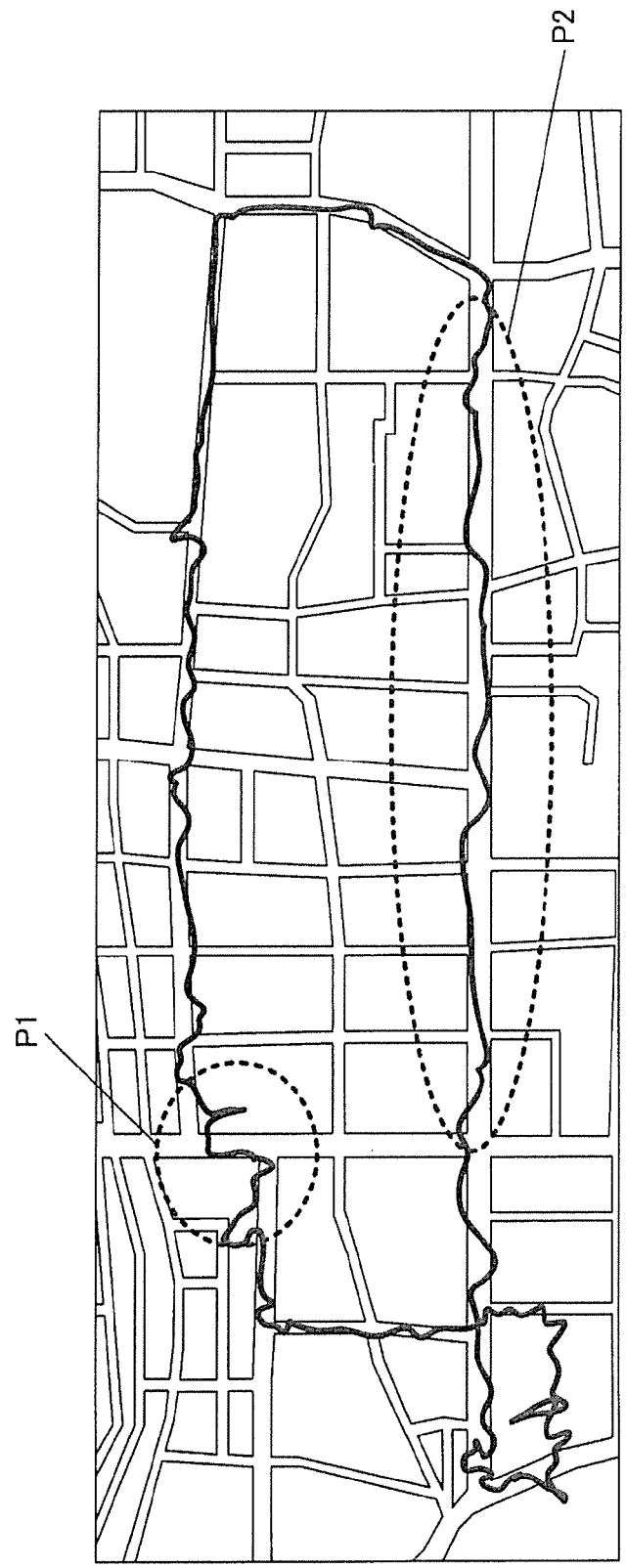
FIG. 22 is a view illustrating an example of an experimental result in known positioning processing.
Figure 23:
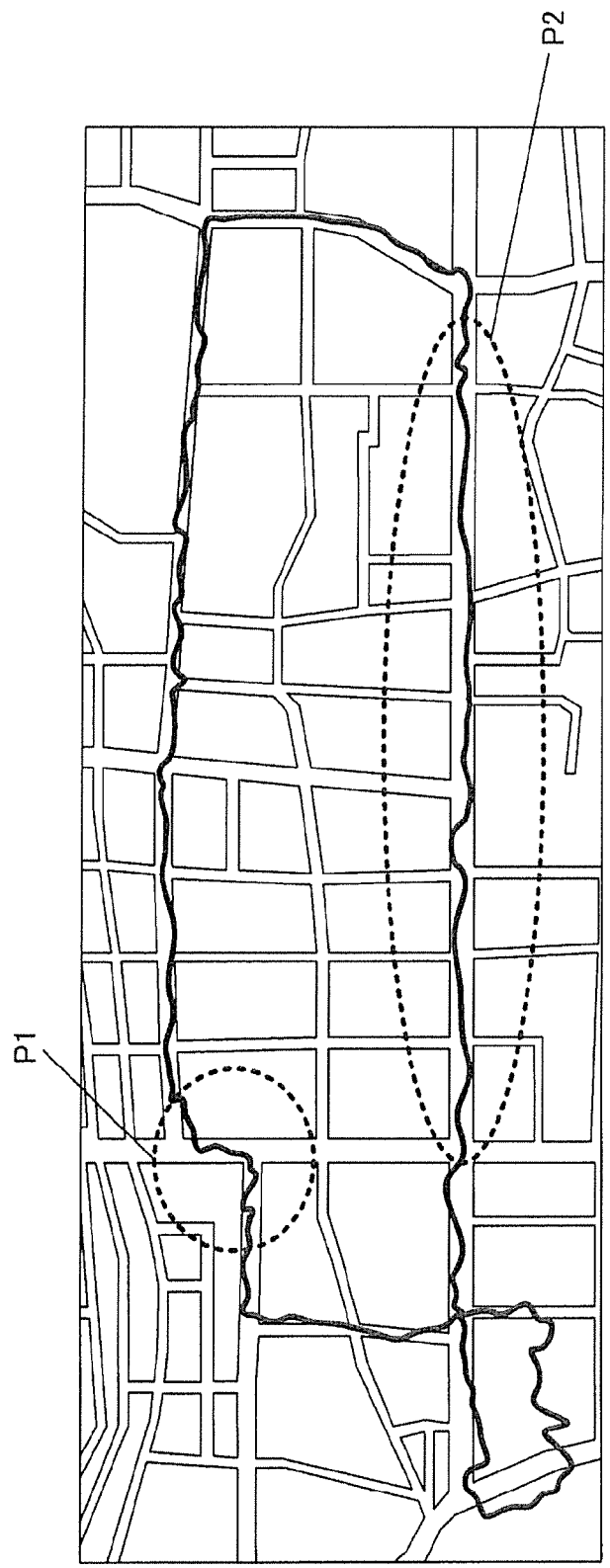
FIG. 23 is a view illustrating an example of an experimental result in positioning processing according to the present embodiment.

FIG. 22 is a view illustrating an example of an experimental result when positioning is performed in known processing, and FIG. 23 is a view illustrating an example of an experimental result when positioning is performed in processing according to the present embodiment. In each of the drawings, there is shown a result obtained by connecting, with a thick solid line, a measured position corresponding to each time in a case where a user who carries the mobile phone 1 starts walking from a lower left side in the drawing, goes around the route set beforehand, and returns to the same position.

As is apparent from FIGS. 22 and 23, it can be seen that the measured position is calculated more accurately by processing according to the present embodiment. For example, in the known processing, it can be seen that the trace of a measured position is not drawn properly on a road because the measured position in a portion P1 indicated by a dotted line greatly changes. On the other hand, in the processing according to the present embodiment, it can be seen that the trace of the measured position in the portion P1 is on a road. This is because the positioning accuracy has been improved due to the change of the position R value in the position R value change processing based on the various amounts at the time of capture in step T3 of the position R value determination processing of FIG. 21 and the position R value change processing for weak electric field environment in step T11.

Furthermore, in the known technique, the trace of the measured position in a portion P2 indicated by a dotted line is not linearly drawn on the road. In the technique according to the present embodiment, however, an almost linear trace is drawn. This is because the positioning accuracy has been improved due to the change of the position R value in the position R value change processing based on the various amounts at the time of capture in step T3 of the position R value determination processing of FIG. 21 and the position R value change processing for strong electric field environment in step T15.

5. Operations and Effects

According to the present embodiment, capture processing for capturing a GPS satellite signal from a GPS satellite is executed to measure the code phase of the GPS satellite signal. In addition, an initial value of the position R value as a measurement error used in the position correction processing of the state vector 'X' regarding the captured satellite is set on the basis of the signal strength of the captured GPS satellite signal, and the position R value the initial value of which is set is changed on the basis of the various amounts at the time of capture when capture processing on the GPS satellite signal from the captured satellite is performed.

Here, an integration time when the correlation operation section 321 has performed incoherent processing (integration time), an elapsed time from a time when an actual measurement value is acquired to the present (measurement acquisition reference time elapsed time), a sweep interval of a frequency when coherent processing and incoherent processing are performed (frequency sweep interval), and the existence of a peak of an integrated correlation value acquired in incoherent processing are included in the various amounts at the time of capture.

By predicting an approximate value of the position R value, which is a measurement error included in the observed value 'Z', on the basis of the signal strength of the captured GPS satellite signal and setting the value as an initial value and then changing the initial value of the position R value on the basis of the various amounts at the time of capture, it becomes possible to set a proper value as the position R value and to improve the positioning accuracy.

Furthermore, in the present embodiment, the position R value is changed on the basis of the observed value 'Z' of the Kalman filter. As the observed value 'Z' increases, a difference between a predicted value and an actual measurement value of the code phase of the captured GPS satellite signal increases. Accordingly, the accuracy of the measured position obtained by the position correction processing is reduced. However, a proper value is set as the position R value by adding a large value to the position R value as the observed value 'Z' becomes large, such that correction of position is appropriately performed.

Furthermore, in the present embodiment, processing for changing the position R value is performed on the basis of the angle of elevation of the captured satellite and the evaluation level of the GPS satellite signal determined from the XPR. In addition, an addition amount of the position R value in this case is changed according to the receiving environment of the GPS satellite signal. Specifically, the addition amount of the position R value with respect to the same angle of elevation and the same evaluation level is set large when the receiving environment is a weak electric field environment, and the addition amount of the position R value with respect to the same angle of elevation and the same evaluation level is set small when the receiving environment is a strong electric field environment.

Thus, by changing the change amount of the position R value according to the receiving environment of the GPS satellite signal, the position R value can be set more properly in consideration of the receiving environment of the GPS satellite signal. As a result, the positioning accuracy can be further improved.

6. Modifications 6-1. Electronic Apparatus

The invention may be applied to any kind of electronic apparatus as long as the electronic apparatus includes a positioning device. For example, the invention may also be applied similarly to a notebook computer, a PDA (personal digital assistant), a car navigation apparatus, and the like.

6-2. Satellite Positioning System

In the above embodiment, an explanation has been made using a GPS as an example of a satellite positioning system. However, other satellite positioning systems, such as a WAAS (wide area augmentation system), a QZSS (quasi zenith satellite system), a GLONASS (global navigation satellite system), and a GALILEO, may also be used.

6-3. Division of Processing

It is possible to make the host CPU 50 execute some or all of processing executed by the positioning operation section 33. For example, the host CPU 50 is made to perform position R value determination processing and the positioning operation section 33 is made to perform positioning processing using a determined position R value. Alternatively, the host CPU 50 may be made to execute all processing including LS positioning processing and KF positioning processing executed by the positioning operation section 33.

6-4. Determination of an Evaluation Level

In the above embodiment, a case in which the measurement acquisition operation section 32 performs calculation of the XPR and determination of the evaluation level has been described. However, the positioning operation section 33 may determine the evaluation level on the basis of the XPR calculated by the measurement acquisition operation section 32.

6-5. Change of a Position R Value Based on Reliability of a Captured Satellite Signal In the above embodiment, a case in which the position R value is changed on the basis of the evaluation level determined from the XPR has been described. However, the position R value may be directly changed on the basis of the XPR without using the evaluation level. In this case, the position R value is changed by storing data for change of position R value corresponding to XPR, in which the correspondence relationship between the XPR and the position R value addition amount is set, in the ROM 35 and then adding the position R value addition amount read from the data for change of position R value corresponding to XPR to the position R value.

6-6. Addition and Subtraction of a Position R Value

Furthermore, in the above embodiment, a case in which the position R value is changed by adding a value to a reference position R value has been described. However, the position R value may also be changed by subtracting a value from the reference position R value. In this case, the position R value is changed by setting a position R value addition and subtraction amount instead of the position R value addition amount for data for change of position R value stored in the ROM 35 and then adding the position R value addition amount to the reference position R value or subtracting the position R value subtraction amount from the reference position R value.

What is claimed is:

1. A positioning method, comprising:
capturing a satellite signal from a positioning satellite;
predicting a state vector including a position of a positioning device and a velocity of the positioning device based on the satellite signal;
predicting a first distance-equivalent value indicating a distance between the positioning satellite and the positioning device;
measuring a second distance-equivalent value indicating a predicted value of the distance between the positioning satellite and the positioning device;
calculating an observed value indicating a difference between the first distance-equivalent value and the second distance-equivalent value;
setting a measurement error for the positioning satellite based on a signal strength of the satellite signal;
changing the measurement error based on a capture data indicating a data of capturing of the satellite signal, the capture data being an integration time; and
correcting the state vector using the observed value, and the changed measurement error,
the capturing of the satellite signal including calculating a correlation value and integrating the correlation value,
the changing of the measurement error including at least changing the measurement error based on the integration time in the integrating of the correlation value.

2. The positioning method according to claim 1, wherein
the capturing of the satellite signal includes calculating a correlation value and integrating the correlation value, and
the changing of the measurement error includes at least changing the measurement error when an integrated correlation value, which is a result of the integrating of the correlation value, satisfies a predetermined low reliability value condition.

3. A positioning method, comprising:
capturing a satellite signal from a positioning satellite;
predicting a state vector including a position of a positioning device and a velocity of the positioning device based on the satellite signal;

predicting a first distance-equivalent value indicating a distance between the positioning satellite and the positioning device;

measuring a second distance-equivalent value indicating a predicted value of the distance between the positioning satellite and the positioning device;

calculating an observed value indicating a difference between the first distance-equivalent value and the second distance-equivalent value;

setting a measurement error for the positioning satellite based on a signal strength of the satellite signal;

changing the measurement error based on an angle of elevation of the positioning satellite with respect to the positioning device; and correcting the state vector using the observed value and the changed measurement error.

4. The positioning method according to claim 3, further comprising determining a receiving environment of the satellite signal from the positioning satellite; and changing a change amount of the measurement error based on the angle of elevation according to the determined receiving environment.

5. A positioning method, comprising:

capturing a satellite signal from a positioning satellite;

predicting a state vector including a position of a positioning device and a velocity of the positioning device based on the satellite signal;

evaluating a reliability of the satellite signal based on the correlation value by correlating the satellite signal and a replica signal;

predicting a first distance-equivalent value indicating a distance between the positioning satellite and the positioning device;

measuring a second distance-equivalent value indicating a predicted value of the distance between the positioning satellite and the positioning device;

calculating an observed value indicating a difference between the first distance-equivalent value and the second distance-equivalent value;

setting a measurement error for the positioning satellite based on a signal strength of the satellite signal;

changing the measurement error based on the reliability; and correcting the state vector using the observed value and the changed measurement error.

6. The positioning method according to claim 5, further comprising determining a receiving environment of the satellite signal from the positioning satellite; and changing a change amount of the measurement error based on the reliability according to the determined receiving environment.

* * * * *